US009501409B2

United States Patent
Pizlo

(10) Patent No.: US 9,501,409 B2
(45) Date of Patent: Nov. 22, 2016

(54) CONCURRENT ACCESSES OF DYNAMICALLY TYPED OBJECT DATA

(71) Applicant: Apple Inc., Cupertino, CA (US)

(72) Inventor: Filip J. Pizlo, Capitola, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/231,464

(22) Filed: Mar. 31, 2014

(65) Prior Publication Data

US 2015/0067639 A1    Mar. 5, 2015

Related U.S. Application Data

(60) Provisional application No. 61/872,386, filed on Aug. 30, 2013.

(51) Int. Cl.
| | | |
|---|---|---|
| G06F 9/44 | (2006.01) | |
| G06F 12/08 | (2016.01) | |
| G06F 9/455 | (2006.01) | |
| G06F 9/45 | (2006.01) | |

(52) U.S. Cl.
CPC ........... *G06F 12/0815* (2013.01); *G06F 8/315* (2013.01); *G06F 8/4443* (2013.01); *G06F 9/4431* (2013.01); *G06F 9/4552* (2013.01); *G06F 9/45508* (2013.01); *G06F 9/45516* (2013.01); *G06F 9/45529* (2013.01); *G06F 9/4443* (2013.01); *G06F 9/45504* (2013.01); *G06F 2212/621* (2013.01)

(58) Field of Classification Search
None
See application file for complete search history.

(56) References Cited

U.S. PATENT DOCUMENTS

| | | |
|---|---|---|
| 7,321,965 B2 | 1/2008 | Kissell |
| 7,519,639 B2 | 4/2009 | Bacon et al. |
| 7,526,760 B1 | 4/2009 | Daynes et al. |
| 7,761,676 B2 | 7/2010 | Doshi et al. |
| 7,805,710 B2 | 9/2010 | North |
| 7,975,001 B1 | 7/2011 | Stefansson et al. |
| 8,001,070 B2 | 8/2011 | Zhang et al. |
| 8,108,649 B2 | 1/2012 | Inoue et al. |
| 8,146,054 B2 | 3/2012 | Baker et al. |
| 8,332,832 B2 | 12/2012 | Slavin et al. |
| 8,370,822 B2 | 2/2013 | Sazegari et al. |
| 8,392,881 B1 | 3/2013 | Lund et al. |
| 2012/0054725 A1 | 3/2012 | Inglis et al. |

(Continued)

FOREIGN PATENT DOCUMENTS

WO    WO 2010/033997 A2    3/2010

OTHER PUBLICATIONS

PCT International Search Report and Written Opinion of the International Searching Authority for PCT/US2014/052286 mailed Nov. 24, 2014.

(Continued)

*Primary Examiner* — Qamrun Nahar
(74) *Attorney, Agent, or Firm* — Blakely, Sokoloff, Taylor & Zafman LLP

(57) ABSTRACT

A method and an apparatus for an enhanced object model to allow concurrent execution for program code generated from dynamic programming languages, such as JavaScript, are described. An index structure may be introduced to an object model representing a dynamically typed object in addition to a type structure and a data payload storing property or field values of the object. Elements of the index structure may point at corresponding property values as an indirection for accessing the object.

19 Claims, 15 Drawing Sheets

(56) References Cited

U.S. PATENT DOCUMENTS

| | | | | |
|---|---|---|---|---|
| 2012/0151495 A1* | 6/2012 | Burckhardt | ............ | G06F 9/485 718/106 |
| 2013/0067441 A1 | 3/2013 | Lafreniere et al. | | |

OTHER PUBLICATIONS

Stefan Brunthaler Ed—Theo Da Hon: "Inline Caching Meets Quickening", Jun. 21, 2010, Ecoop 2010 A Object-Oriented Programming, Springer Berlin Heidelberg, Berlin, Heidelberg, pp. 429-451, XP019146075, ISBN: 978-3-642-14106-5.

Maciej Stachowiak: "Introducing SquirrelFish Extreme", Surfin' Safari—Blog Archive, Sep. 18, 2008, pp. 1-4, XP055151781, retrieved from the Internet: URL:https://www.webkit.org/blog/214; [retrieved on Nov. 7, 2014].

Li, Xiao-Feng, "GC safe-point (or safepoint) and safe-region," Jan. 26, 2008, downloaded from http://xiao-feng.blogspot.com/2008/01/gc-safe-point-and-safe-region.html, Mar. 31, 2014, 5 pages.

Soman, Sunil et al., "Task-Aware Garbage Collection in a Multi-Tasking Virtual Machine," Proceedings of the 5$^{th}$ International Symposium on Memory Management, ISMM '06, Jun. 10-11, 2006, Ottowa, Canada, pp. 64-73.

Leary, Chris "Mapping the monkeysphere," Honest to a Segfault, Jun. 8, 2011, downloaded from blog.cdleary.com/2011/06/mapping-the-monkeysphere/, Jul. 3, 2013.

Risco-Martin et al., Design Flow of Dynamically-Allocated Date Types in Embedded Applications Based on Elitist Evolutionary Computation Optimization, 11$^{th}$ Euromicro Conference on Digital System Design Architectures, Methods and Tools, 978-0-7695-3277—Jun. 2008 © 2008 IDDD DOI 10.1109/DSD.2008,118.

"Inline caching," Wikipedia, Wikimedia Foundation, Inc., Jan. 2, 2012, downloaded from http://en.wikipedia.org/w/index.php?title=inline_caching&printable=yes, Apr. 1, 2014, 4 pages.

PCT International Search Report and Written Opinion of the International Searching Authority for PCT/US2014/052289 mailed Nov. 7, 2014.

Andreas Gal et al., "Trace-based Just-in-Time Type Specialization for Dynamic Languages", Proceedings of the 2009 ACM Sigplan Conference on Programming Language Design and Implementation, PLDI '09, vol. 44, Jan. 1, 2009.

Daniele Bonetta et al., "TigerQuoll", Association for Computing Machinery, ACM Press, New York, New York, USA, vol. 48, No. 8, Feb. 23, 2013.

Jungwoo Ha et al., "A Concurrent Trace-based Just-In-Time Compiler for Single-threaded JavaScript", 2$^{nd}$ Workshop on Parallel Execution of Sequential Programs on Multi-core Architectures PESPMA 2009 Jun. 21, 2009.

Davide Ancona et al., "RPython: a step towards reconciling dynamically and statically typed 00 languages", Proceedings of the 2007 Symposium on Dynamic Languages, DLS '07, Jan. 1, 2007, pp. 53-64.

PCT International Search Report and Written Opinion of the International Searching Authority for PCT/US2014/052581 mailed Nov. 10, 2014.

Shisheng Li et al. "TypeCastor: demystify dynamic typing of JavaScript applications", Proceedings of the 6$^{th}$ International Conference on High Performance and Embedded Architectures and Compilers, HIPEAC '11, Heraklion, Crete, Greece, Jan. 1, 2011, pp. 55-65, XP055150141, New York, New York, USA.

Jennifer B. Sartor et al. "Z-rays: divide arrays and conquer speed and flexibility", Proceeding of the 2010 ACM Sigplan Conference on Programming Language Design and Implementation, PLDI '10, Jun. 5, 2010, pp. 471-482, XP055148793, New York, New York, USA.

Jose Castanos et al. "On the benefits and pitfalls of extending a statically typed language JIT compiler for dynamic scripting languages", Proceedings of the ACM International Conference on Object Oriented Programming Systems Languages and Applications, OOPSLA '12, Oct. 20-24, 2014 in Portland, Oregon, USA, vol. 47, Oct. 10, 2012, pp. 195-212, XP055148915, New York, New York, USA.

Lukas Diekmann et al. "Memory Optimizations for Data Types in Dynamic Languages", Masterarbeit of Institut Fur Informatik, Softwaretechnik und Programmiersprachen, Heinrich Heine Universitat Dusseldorf, Feb. 23, 2012, pp. 1-51, XP055150140.

Mojtaba Mehrara et al. "Dynamically accelerating client-side web applications through decoupled execution", Code Generation and Optimaization (CGO), 2011 9$^{th}$ Annual IEEE/ACM Int. Symposium On, IEEE, Apr. 2, 2011, pp. 74-84, XP031863934.

Li et al. TypeCastor: Demystify Dynamic Typing of JavaScript Applications, Proceedings of the 6$^{th}$ International Conference on High Performance and Embedded Architecures and Compilers, HIPEAC '11, Heraklion, Crete, Greece, Jan. 1, 2011, pp. 55-65, XP055150141, New York, Ney York, USA.

Sartor et al: "Z-rays: divide arrays and conquer speed and flexibility", Proceedings of the 2010 ACM Sigplan Conference on Programming Language Design and Implementation, PLDI '10, Jun. 5, 2010, pp. 471-482, XP055148793, New York, New York, USA.

PCT International Preliminary Report on Patentability and Written Opinion of the International Searching Authority for PCT Application No. PCT/US2014/052286, Mar. 1, 2016, (14 pages).

PCT International Preliminary Report on Patentability and Written Opinion of the International Searching Authority for PCT Application No. PCT/US2014/052299, Mar. 1, 2016, (9 pages).

PCT International Preliminary Report on Patentability and Written Opinion of the International Searching Authority for PCT Application No. PCT/US2014/052581, Mar. 1, 2016, (11 pages).

* cited by examiner

900

Generating initial inline code from a source code block of a source code, the source code block specifying at least one access to an object, the initial inline code having serial inline cache code to perform the one access to the object, the serial inline cache code including a serial slow code path and a fast code path, the serial inline cache code to determine whether to perform the one access to the object via the fast code path or the serial slow code path 901

Generating concurrent inline code from the source code block, the concurrent inline code having concurrent inline cache code to perform the one access to the object, the concurrent inline cache code including a concurrent slow code path and the fast code path, the concurrent inline cache code to determine whether to perform the access to the object via the fast code path or the concurrent slow code path 903

Executing the initial inline code via a particular thread to perform the at least one access to the object, the serial inline cache code embedding one or more constant parameters associated with an object type for the fast code path, the serial slow code path to be executed via the particular thread to update values of th constant parameters of the serial inline cache code 905

Executing the concurrent inline code via one or more threads to perform the at least one access to the object, the concurrent inline cache code embedding the constant parameters for the fast code path, the concurrent slow code path to be executed concurrently to update values of the constant parameters of the concurrent inline cache code, the fast code path to be executed to perform the at least one access to the object if the updated constant parameters of the serial inline cache code or the updated constant parameters of the concurrent inline cache code correspond to an object type matching a type of the object 907

Compiling a serial inline cache code for a function via an initial thread, the function specified in a source code for accessing an object, wherein the initial inline code includes a serial slow code path and a fast code path, the serial slow code path to perform the access of the object via table lookup operations, the fast code path to perform the access of the object via direct memory loading operations via a memory address embedded in the fast code path 1001

Executing the serial slow code path to access the object via an interpreter by the initial thread, wherein the memory address of the fast code path is initialized via the execution of the serial slow code path 1003

In response to a call to the function via a thread separate from the initial thread, compiling a concurrent inline code for the function, the concurrent inline cache code including the fast code path with the memory address initialized via the execution of the serial slow code path, the concurrent inline code having a concurrent slow code path for the access of the object via the table lookup operations, the concurrent inline code to determine whether to perform the access to the object via the concurrent slow code path or the fast code path 1005

Executing the concurrent inline cache code via one or more threads to perform the function without invoking the interpreter, wherein the memory address of the fast code path is reinitialized if the concurrent slow code path of the concurrent inline cache code is executed 1007

Providing an object model in a memory during runtime, the object model representing an object specified with one or more properties in the source code, each property having a property name associated with a property value, the properties of the object having an array relationship, the object model including an object cell allocated in a memory, the object cell having a value pointer and an inline storage, the value pointer for a reference to the property values stored in value storages allocated in the memory 1301

Determining if the inline storage is sized with sufficient space for the value storages to store the property values 1303

Allocating the value storages within the inline storage in the object cell if the inline storage is sized with sufficient space for the value storages, the value storages allocated outside of the object cell if the inline storage is sized with insufficient space for the value storages 1305

Generating instructions for an access to the property values of the object specified in the source code, the instructions including a guard code, a fast code path and a slow code path, the slow code path to locate the value storages outside of the object cell via the value pointer to perform the access of the property value, the fast code path to perform the access of the property values within the object cell without locating the value storages via the value pointer, the guard code to determine whether to invoke the slow code path or the fast code path for the access to the property values, the fast code path to be invoked if the property values have the array relationship and the inline storage of the object cell is sized with sufficient space for the value storages to store the property values 1307

Providing an object model in a memory during runtime, the object model representing an object specified with one or more properties in the source code, each property having a property name associated with a property value, the object model including an object cell allocated in a memory, the object cell having a property pointer, a value pointer and an inline storage, the value pointer pointing to a value storage allocated for storing the property values, the property pointer pointing to a property storage allocated for storing the property names 1401

Identifying a flat array type for the object during runtime, the flat array type indicating that the object represents a array structure, each property name of the object corresponding to an index of the array structure, each property value of the object corresponding to an indexed value of the array structure, wherein the array structure is of a limited length during the runtime, and the array structure allocated within the inline storage of the object cell for the value storage 1403

Generating instructions for an iterative access of the object specified in the source code, the iterative access of the object corresponding to a plurality of accesses to separate property values of the object, wherein the instructions include a guard code, a plurality of fast code paths and a slow code path, the slow code path to locate the value storages via the value pointer to locate the value storage outside of the cell object to perform the iterative access of the property value, the fast code path to perform the plurality of accesses to the separate property values within the object cell without checking the index type of the object, the guard code determining whether to invoke the slow code path or the fast code path for the iterative access to the object, the fast code path to be invoked if the flat array type of the object is identified 1405

Fig. 14

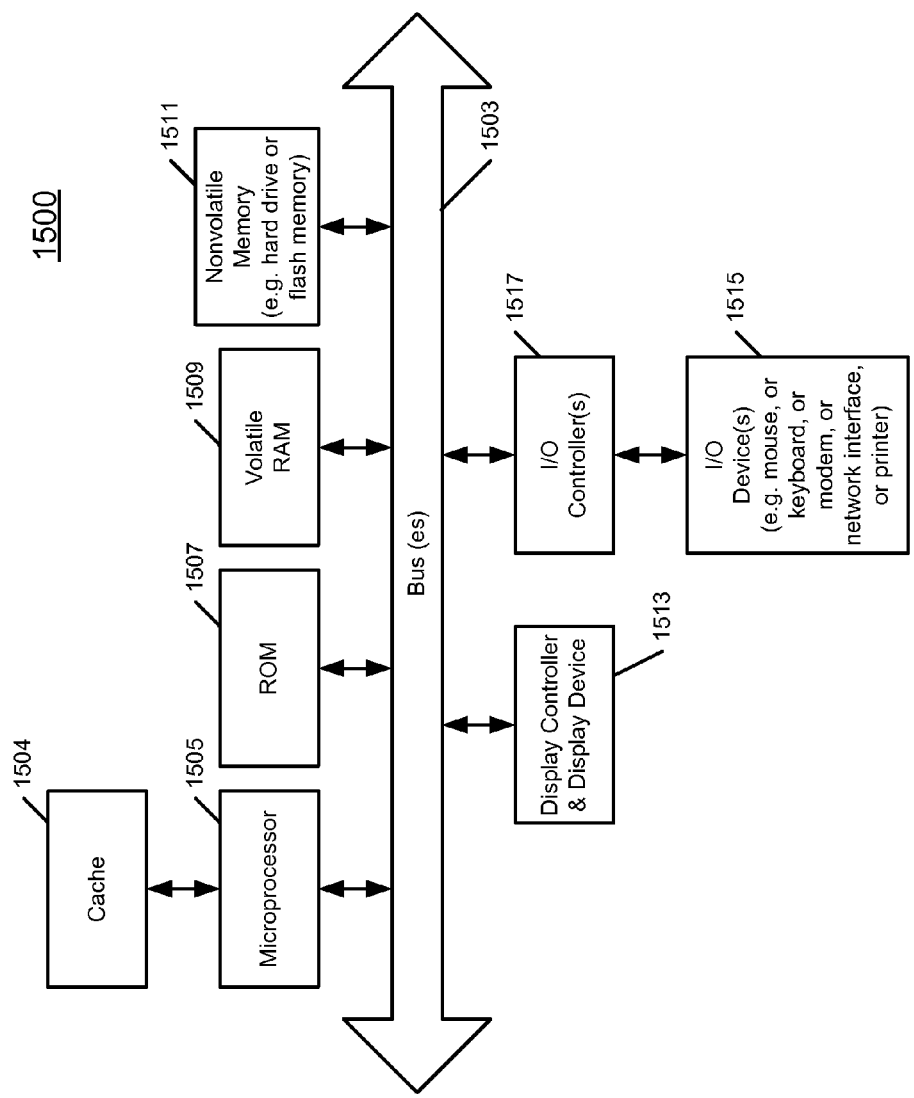

CONCURRENT ACCESSES OF DYNAMICALLY TYPED OBJECT DATA

CROSS-REFERENCE TO RELATED APPLICATIONS

This application is related to, and claims the benefits of, U.S. Provisional Patent Application No. 61/872,386, filed on Aug. 30, 2013, entitled "RUNTIME ACCESS OF DYNAMIC OBJECTS", Filip Pizlo et al. which is hereby incorporated by reference herein in its entirety.

FIELD OF INVENTION

The present invention relates generally to runtime accesses for dynamically typed data. More particularly, this invention relates to dynamically typed data sharing in concurrent executions of dynamic language based code.

BACKGROUND

Dynamic languages, such as JavaScript, Ruby, Python, Perl, and PHP, etc. are increasingly being considered as a replacement for static languages, such as C and C++. Dynamic languages bring benefits such as programmer productivity and a relatively shallow learning curve. However, an obstacle to further adoption of dynamic languages—including JavaScript, Ruby, Python, and others—is the lack of a high-performance shared-memory concurrency mechanism, such as threads and locks, or libdispatch, which are trivially available in static languages. This problem is considered hard, and thus far unsolved, due to how objects work in dynamic languages.

Previous attempts to tackle this problem involved adding locking mechanisms around each object access. While the locking mechanism could ensure the desired concurrency semantics, it is terribly slow. Locking and unlocking may be performed in an order of magnitude slower than a normal heap access, and hence introduce prohibitive overheads.

Additionally, inline cache (IC) is often used in high-performance implementations of JavaScript based code. Typically, inline cache includes self-modifying code. However, concurrent self modifying code that could execute on multiple processors may be both hard and slow. Thus, adding concurrency to inline cache based implementation for JavaScript based code may be impractically expensive.

Further, JavaScript as a language allows for elements to be added to objects after those objects have already been constructed. If a JavaScript based program is executed to add more properties to an object than can be contained in its inline property storage, then a separate out-of-line chunk of memory must be allocated to store its additional properties. JavaScript Arrays are primarily used for indexed property storage. The presence of indexed properties on an object always requires allocation of an out-of-line index property storage object.

Therefore, existing implementations for executing dynamic language based programs tend to lack efficiency, concurrency and effective optimizations.

SUMMARY OF THE DESCRIPTION

Code generated from dynamic programming languages, such as JavaScript, may include an enhanced object model to allow concurrent execution for data accesses during runtime. An index structure may be introduced to an object model representing a dynamically typed object in addition to a type structure and a data payload storing property or field values of the object. Elements of the index structure may point at corresponding property values as an indirection for accessing the object.

In one embodiment, dynamically typed program code (e.g. implementing a certain algorithm) may be allowed to concurrently perform each access operation to a single property value of the object via an additional indirection over the index structure of the object without creating race conditions. Each access (e.g. load/store) operation for a single property value of the object may require multiple instructions and/or atomic operations. During the concurrent execution, these multiple instructions may be allowed to be interleaved in an unsynchronized manner.

In another embodiment, inline cache initialization for accessing dynamically typed objects in a single thread may be off loaded to an interpreter without incurring unnecessary synchronization overhead. A thread bias mechanism may be provided to detect whether a code block is executed in a single thread. Further, the number of inline cache initializations performed via a compiler, such as baseline JIT compiler, can be reduced to improve processing performance.

A code block may be a compilation unit, a section of source code, one or more source code files, or other applicable set of code statements (e.g. a consecutive portion of code specifications). A compilation unit may refer to source code that is compiled and treated as one logical unit. The compilation unit may include one or more entire source code files, but can also be a selected portion of a file or specific code sections. Declarations and definitions within a compilation unit can determine the scope of functions and data objects.

In another embodiment, inline cache initializations in code blocks that are shared by multiple threads may be delayed and timed to reduce occurrences of required processor synchronizations (e.g. light points) to update executable code with the initializations. For example, each thread may store initialized code into a buffer during runtime. A light point timer (e.g. via a special thread) may cause all inline caches to be initialized (e.g. updated to a runtime) periodically (e.g. every 10 ms) so long as the buffer is non-empty with required processor synchronization. As a result, the number of invocations of expensive or slow synchronization operations required for inline cache initialization may be reduced.

In another embodiment, whether an array object is of a flat array type may be dynamically tracked for a dynamic language based program. Array elements of an array object of the flat array type may be stored in an optional inline storage within an object cell allocated to represent the array object. The inline storage in the object cell may be limited by available memory space between adjacent object cells allocated in a memory. The flat array type of the object may be based on whether the object represents an array and whether the inline storage of the object cell has sufficient memory space to store elements of the array. An array object of the flat array type may allow array elements of the array object to be accessed within a object cell without additional memory loading via a pointer stored in the object cell. Further, a type system of a compiler which generates the executable code supporting a flat array type may allow the compiler to perform code optimizations based on the flat array type.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 9 is a flow diagram illustrating one embodiment of a process to self modify inline codes to access dynamically typed object for concurrent execution;

FIG. 10 is a flow diagram illustrating one embodiment of a process to dynamically compile a function code block with inline cache concurrently access property values of an object based on an object model having an index reference;

FIG. 13 is a flow diagram illustrating one embodiment of a process to dynamically compile code to allocate array data inline;

FIG. 14 is a flow diagram illustrating one embodiment of a process to identify a flat array data type during runtime to generate instructions for iteratively accessing objects via flat arrays allocated inline;

FIG. 15 illustrates one example of a data processing system such as a computer system, which may be used in conjunction with the embodiments described herein.

DETAILED DESCRIPTION

Methods and apparatuses for concurrently sharing dynamic typed objects are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1:
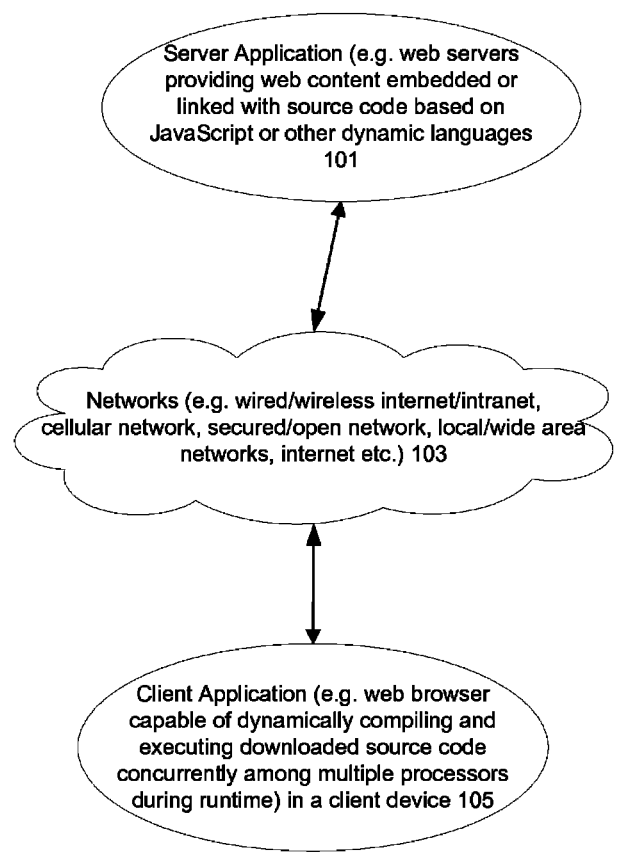
FIG. 1 is a network diagram illustrating an exemplary execution runtime for dynamic language based source coded retrieved from networked devices.

FIG. 1 is a network diagram illustrating an exemplary execution runtime for dynamic language based source codes retrieved from networked devices. In one embodiment, network system 100 may include one or more server applications, such as server application 101, hosted in one or more server devices to provide content available for client application 105 running in a client device. For example, server application 101 may be a web server and client application 105 may be a web browser. Server 101 and client 105 may communicate with each other via network 103 based on, for example, internet protocols such as HTTP (Hypertext Transport Protocol) or other applicable protocols.

In one embodiment, content retrieved from server 101 may include web pages based on hypertext languages, such as HTML (Hypertext Markup Language), XML (Extensible Markup Language) or other markup language, embedded or linked (e.g. hyperlinked) with sources in a dynamic programming language, such as JavaScript, Ruby, Python or other dynamically typed languages. Client 105 may dynamically download or fetch the linked sources for execution. In one embodiment, client 105 may dynamically compile the downloaded sources to optimize code execution for improving performance in a concurrent execution environment, including, for example, multiple threads of execution and/or multiple processors or processing units.

Figure 2:
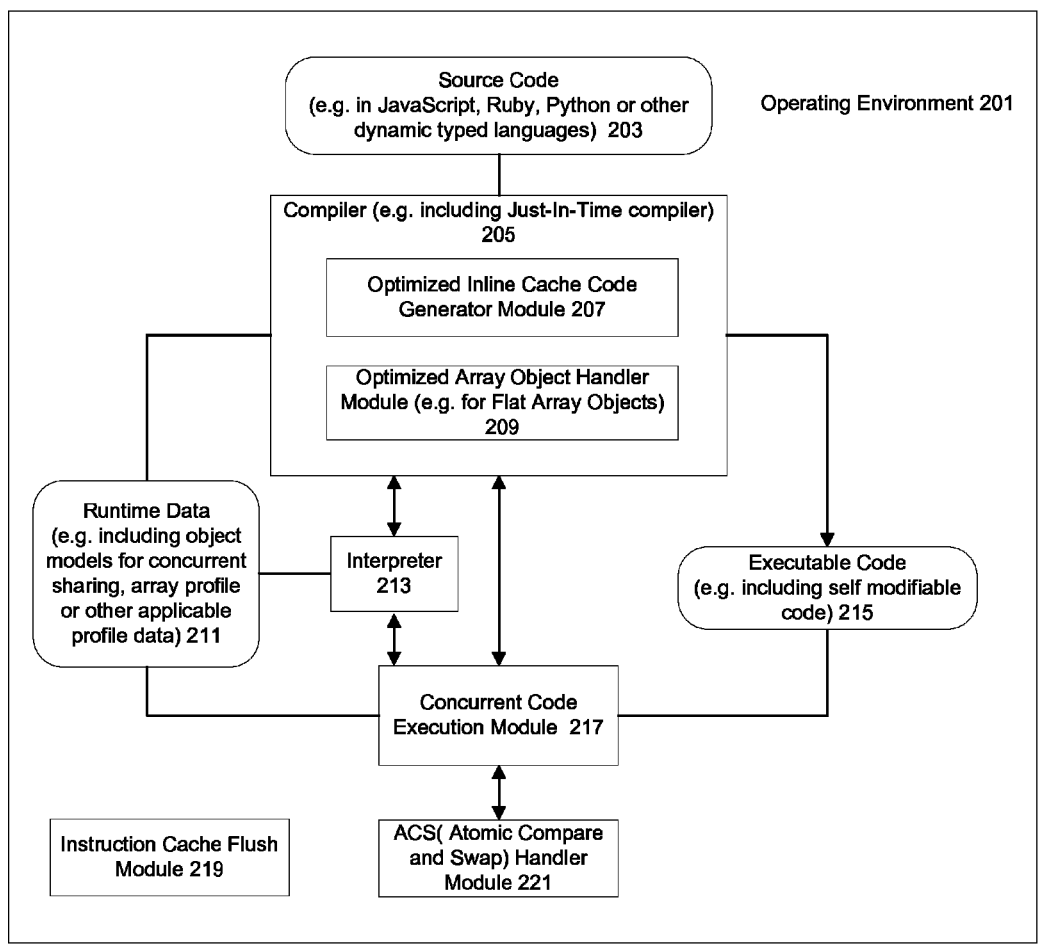
FIG. 2 is a block diagram illustrating one embodiment of a system for concurrent and/or optimized execution for accessing dynamically typed objects.

FIG. 2 is a block diagram illustrating one embodiment of a system for concurrent and/or optimized execution for accessing dynamically typed objects. In one embodiment, system 200 may include operating environment 201, such as an operating system hosting client application 105 of FIG. 1, hosted by one or more processors. Operating environment 201 may include compiler 205 to dynamically and/or continuously compile source code 203 into executable code 215 during runtime, e.g. based on Just-In-Time compilation.

Source code 203 may comprise programs in a dynamic programming language, such as JavaScript, Ruby, Python or other applicable dynamically typed language. Source code 203 may not specify or declare a type or shape of data or objects referenced in code statements. In one embodiment, source code 203 may be retrieved from a remote device, such as server 101 of FIG. 1, by a browser application or other applicable application running in operating environment 201. Compilation module 205 may be controlled by the browser application to perform browsing operations.

Compiler 205 may generate executable code 215 from source code 203. In one embodiment, compiler 205 may parse source code 203 statically or dynamically to emit intermediate code, bytecode or other applicable compiled code to performing data processing operations specified in source code 203. Compiler 205 may provide object models representing dynamically typed objects to enable concurrent execution. For example, the object models may include indirect references to object values to allow sharing of common objects among multi threads or multi processes of executions in a multi processor environment.

In one embodiment, optimized inline cache code generator module 207 may emit inline cache code for accessing (e.g. reading, writing, updating etc.) dynamically typed objects shared by multiple threads of execution. The inline cache code emitted may support optimized runtime binding for concurrent execution without costly processor instruction synchronization. The emitted code may include self modifying code capable of altering its own instructions while it is executing, for example, to initialize the inline cache code.

In one embodiment, concurrent code execution module 217 may invoke interpreter 213 to perform operations based on code generated via compiler 205. For example, interpreter 213 can update bytecodes according to the self modifying instructions emitted via compiler 205 without activating instruction cache flush to synchronize instructions among different processors. In some embodiments, instruction cache flush module 219 may periodically invoke instruction cache flush via, for example, a dedicated thread.

According to certain embodiments, compiler 205 may include optimized array object handler module 209 to provide executable code capable of identifying a special type (e.g. a flat array type) of dynamically typed data during runtime to optimize array data processing. As a result, repetitive or iterative processing of array objects via concurrent code execution module 217 may achieve execution performance comparable to executing instructions for similar operations compiled with statically typed array data type (e.g. with a pre specified array type to optimize array data processing).

Concurrent code execution module 217 may invoke ACS (atomic compare and swap) handler module 221 based on executable code 215 to perform synchronized update operations without relying on costly software based lock/unlock mechanism. ACS handler module 221 may be supported directly via processor hardware logic to ensure an atomic update operation is performed without interruption (e.g. within one processor instruction cycle).

In one embodiment, types of runtime values for variables in a program or executable code may be identified and profiled (e.g. analyzed, summarized, etc.) during runtime while the program (e.g. executable code 217) is running. Based on the identified types through past execution history, future types of runtime values may be predicted to update or recompile the program to replace portions of the program or code taking advantage of the type predictions For example, profiling data (e.g. indicating types of data or objects during runtime) may be collected in runtime data 211. Compiler 205 may continuously optimize executable code 215 via recompilation based on the profiling data. Profiling code may be embedded in executable code 215 to enable collection of the profiling data during runtime.

Concurrent Access for Dynamically Typed Objects

In one embodiment, concurrent object models may be provided to allow concurrent executions of multiple machine instructions required to access (e.g. read, write, update, etc) a dynamically type object without corrupting memory heaps. An object may include one or more fields or properties. The fields or properties of a dynamically typed object may come into existence during runtime when assigned via executable code for the first time. A dynamic language based source program or code corresponding to the executable code may not include up front declarations of all fields of the object. The object may be represented as a complex data structure (or shape). Each access to the object may include executing multiple machine instructions.

The concurrent object models may include property indexes to allow concurrent accesses to a common object or racing memory access via multiple machine instructions interleaved from multiple threads (or processes) of executions (e.g. in a multiprocessor environment) without requiring coordination via extra synchronization. The result of the accesses to the object may be consistent independent of the order of how these instructions are interleaved. Thus, the concurrent object model may enable atomic access via multiple instructions, each instruction having a single-machine-instruction property of atomic execution. Thus, the concurrent object model can allow racing memory accesses to read, write and update a dynamically typed object concurrently in a consistent and well-defined (e.g. according to the semantics of these access operations) without heap corruption.

According to certain embodiments, an object may be represented via a cell and a payload. The cell can contain references to a structure and the payload. For example, the cell can include a structure identifier identifying the structure and a payload pointer pointing to where the payload is stored. The structure can indicate what fields or properties the object has and what those fields' indices are in the payload. In some embodiments, the structure can include a set of property names representing the fields. The payload may contain the values of those fields (or property values).

An example allocation of a cell representing a dynamically typed object based on a concurrent object model may include:

```
struct Cell
{
    int structure;
    Value **index;
};
``` where Cell.Value may represent an integer or other applicable property values or field values for the object. Cell.structure may be an integer reference to a structure of the object. Two objects sharing a common value of Cell.structure may indicate these two objects are of the same dynamic type or shape. In one embodiment, Cell.structure may represent an index to a table representing different types of dynamic structures.

Cell.index may include an indirect reference to a payload or property values of the object. In one embodiment, Cell.index may provide one layer of indirection to allow the payload of the object to grow dynamically for concurrent access of the object data (e.g. property values) without causing racing conditions with inconsistent data access results. The index itself may include an array indexed via field offsets and contains within it pointers to actual field values (or property values).

In one embodiment, Cell.index may contain immutable field references or values as an invariant in object data access. Although field values of an object may change, the object cell representing the object may include unvaried references to the field values. Concurrent object access may be implemented without synchronization cost.

For example, a typical object read program statement for accessing the object (e.g. v=o.f to read property f of object o) may be performed with the following operations (e.g. generated by a compiler) with inline cache optimization:

```
if (o->structure == ExpetedStructure)
    v= *(o->index[OffsetOfF]) ;
else
    v = SlowPathRead(o);
```

SlowPathRead( ) may represent an object read routine including an execution to resolve or locate a property or field value of an object via, for example, table lookup or hash operations over a dynamic structure or shape of the object. ExpectedStructure may represent an object type encountered before during runtime with offset value OffsetOfF already resolved.

A typical object write program statement for accessing the object (e.g. o.f=v to update property f of object o with value v) may be compiled differently depending on whether the object (e.g. o) already has a referenced field (e.g. f). As objects in dynamic languages, such as JavaScript, do not have to have their fields pre declared up front, it may be common to perform an object write that creates a new field dynamically any time during the runtime. As well, as in other imperative programming languages, it is common to overwrite field values of existing fields of an object.

In one embodiment, the case for a write access to an object (e.g. o.f=v) writing to a field that already exists (e.g. o.f=v to write value v to existing field f of object o), may be performed via the following operations, e.g. ExistingWrite( ):

```
if (o->structure == ExpetedStructure)
    *(o->index[OffsetOfF]) =v;
else
    SlowPathWrite(o,v);
```

ExistingWrite( ) may include an indirection (e.g. loading a pointer to a pointer) through Cell.index, for example, via an atomic machine instruction. The value of pointer at Cell.index may be guaranteed to remain unchanged even if field values are changed. SlowPathWrite( ) may represent an object write routine including an execution to resolve field value of an object similar to SlowPathRead( ).

The case for a write access to an object (e.g. o.f=v) writing to a field that does not exist may be performed via the following operations, e.g. AdditiveWrite( ):

```
if (o->structure =n= ExpetedStructure)
{
    Value** oldIndex = o->index;
    Value** newIndex = reallocateIndex(oldIndex);
    newIndex[OffsetOfF] = new Value(v);
    if(!CAS (&o->structure,&o->index,ExpectedStructure,
        oldIndex,NewStructgure, newIndex))
            SlowPathWrite(o,v);
}
Else
    SlowPathWrite(o,v);
```

In one embodiment, AdditiveWrite( ) can guarantee that Cell.strucutre and Cell.index (e.g. representing structure and payload of the object) are changed at the same time in one atomic operation, such as CAS( ) operation.

A CAS (compare and switch) operation may be hardware or processor supported routine to ensure completion of both compare and switch operations atomically without interruption. In one embodiment, the CAS operation may be two words atomic to change both the structure (e.g. Cell.structure) and the index (e.g. Cell.index) of the object at the same time, provided that the two words are adjacently located in memory.

An index's Value* entries may be copied in AdditiveWrite( ) via 'reallocateIndex( )' without copying any field values referenced by the entries. Additional field value or Value box may be allocated via 'new Value( )' in memory to hold one field or property value for the object. The value v can be stored into this newly allocated Value box.

In one embodiment, an access to an object for deleting a field of the object based on the concurrent object model may guarantee that the index of the object (e.g. Cell.index) contains immutable pointers. Repeated deletions of fields may force an object to become a plain hashtable where optimizations for object accesses may be deactivated. For example, the concurrent object model may not reclaim a deleted field's memory if the deleted field of an object was added prior to the object becoming a plain hashtable. Once an object becomes a hashtable (e.g. in a hashtable mode), accesses to the object may use a per-object lock for synchronizing multiple accesses. In certain embodiments, the garbage collection mechanism may compress or reclaim no longer used or inactive object indexes.

Figure 3:
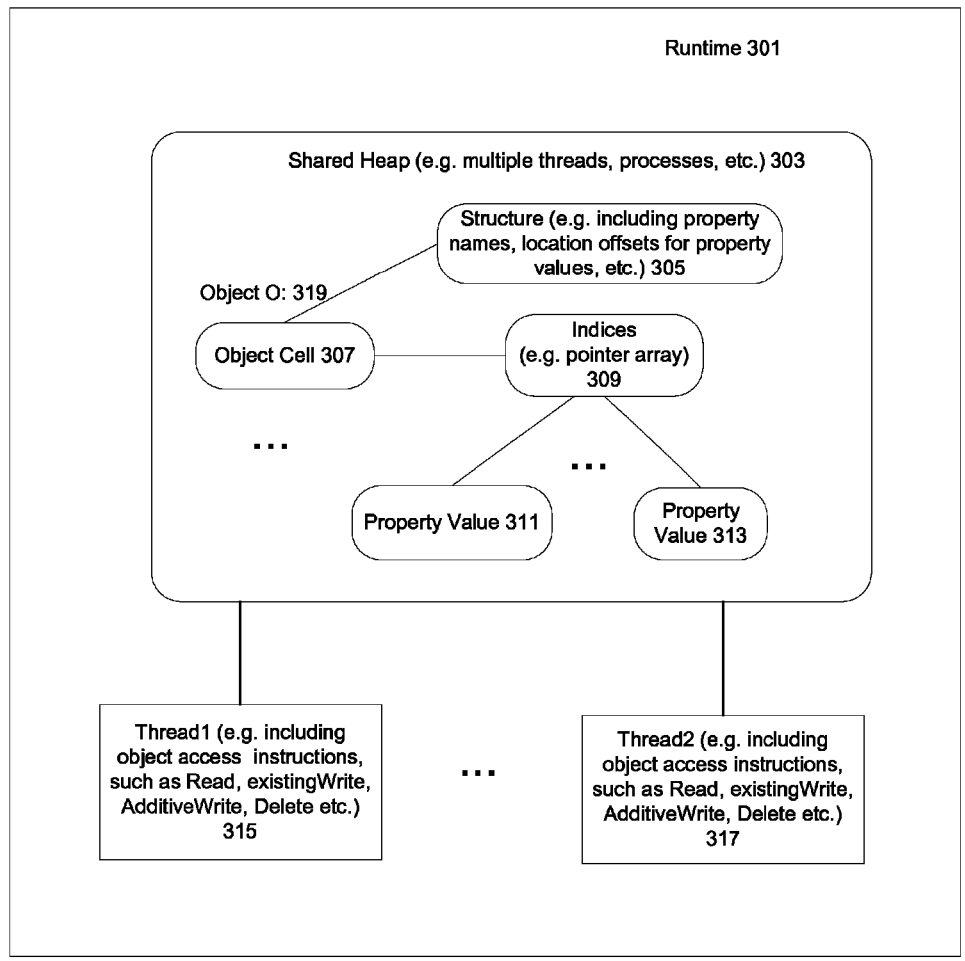
FIG. 3 is a block diagram illustrating one exemplary runtime for multiple threads of executions sharing common dynamically typed objects.

FIG. 3 is a block diagram illustrating one exemplary runtime for multiple threads of executions sharing common dynamically typed objects. Runtime 301 may be associated with system 200 of FIG. 2. For example, Runtime 301 may include portions of Runtime Data 211 of FIG. 2. In one embodiment, Shared Heap 303 may include runtime data or objects shared via multiple threads or processes, such as Thread1 315, Thread2 317, or other applicable threads or processes via one or more processors.

For example, a dynamically typed Object O 319 shared between Thread1 315 and Thread2 317 may correspond to Object Cell 307. Object O 319 may have dynamic properties represented via Structure 305 and one or more Property Value 311, 313, etc. Structure 305 may specify a dynamic type of Object O 319. For example, Structure 305 may include property names of the dynamic properties and location information, such as memory offsets, to locate corresponding property values.

Object Cell 307 may reference its properties via direct or indirect pointers. For example, Object Cell 307 may include direct pointers pointing to Structure 305 and an indirect pointer for Property Values 311, 313 via Indices 309. Indices 309 may store an array of pointers, each pointing to one property value (or property storage). Location information for each property value in Structure 305 may correspond to an index to the pointer array of Indices 309.

Operations for accessing Object O 319 may be performed concurrently via Thread1 315 and Thread2 317. Object access operations may include Read( ) ExistingWrite( ), AdditiveWrite( ) and/or Delete( ), etc. Each object access operation may require more than one atomic machine instruction. The concurrent object model may allow adding additional properties to Object O 319 without copying existing Property Values 311, 313 to avoid race conditions between copying property values and updating property values.

Figure 4:
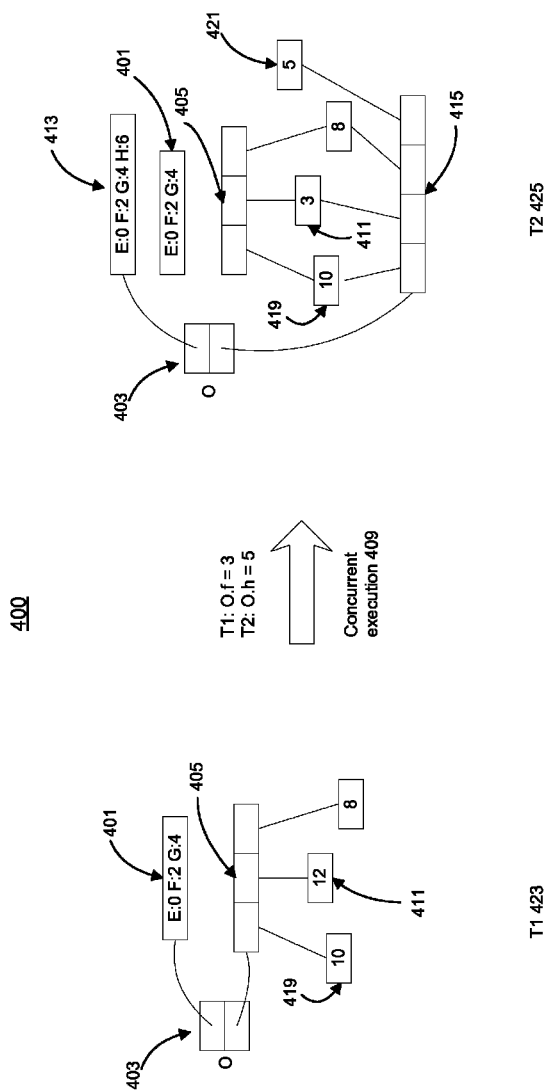
FIG. 4 illustrates exemplary allocations of a dynamically typed object shared via concurrent execution.

FIG. 4 illustrates exemplary allocations of a dynamically typed object shared via concurrent execution. Example 400 may be based on some components of system 200 of FIG. 2. For example, object O 403 may be allocated in runtime data 211 of FIG. 2. At time instance T1 423, object O 403 may have property (E,F,G) indicated in structure 401 with corresponding property values 10, 12 and 8. Object O 403 may reference indices 405 storing a pointer array with pointers pointing to the property values.

In one embodiment, structure 401 may specify an offset for each property (e.g. E, F or G) to locate a pointer in indices 405 for the corresponding property value. For example, an offset of 2 may be identified for property F in Structure 401 to locate a pointer at offset 2 pointing to property storage 411 storing property value 12. Object O 403 at time T1 423 may have a dynamic property corresponding to name-value pairs (or field values) as (E:10, F:12, G:8).

Threads T1 and T2 409 may simultaneously access Object O 403 without employing software synchronization mechanisms such as lock, critical section etc. For example, thread T1 may perform program statement o.f=3 (e.g. via Existing-Write( )) to update property F with value 3. At the same time, thread T2 may perform program statement o.h=5 (e.g. via AdditiveWrite( )) to add a new property H with value 5 to Object O 403.

As a result of the concurrent or simultaneous executions of T1 and T2 409, Object O 403 may be associated with a separate Structure 413 and a separate Indices 415 to dynamically grow its structure to accommodate newly added property (or attribute, field) H. Structure 413 may include a copy of (previous) Structure 401 and attributes of the newly added property H. Indices 415 may include a copy of (previous) Indices 415 and a pointer to a newly allocated property storage 421 storing property value 5. In other words, the structure of Object O 403 may be reallocated from Structure 401 to Structure 413 and the indices of Object O 403 may be reallocated from Indices 405 to Indices 415. Property storages for existing property values, such as property storage 419 for property E, remain unchanged. Property storage 411 is updated with property value 3 for property F. As existing property values remain stored in the same property storages, race conditions to update and relocate the property values can be avoided.

Figure 5:
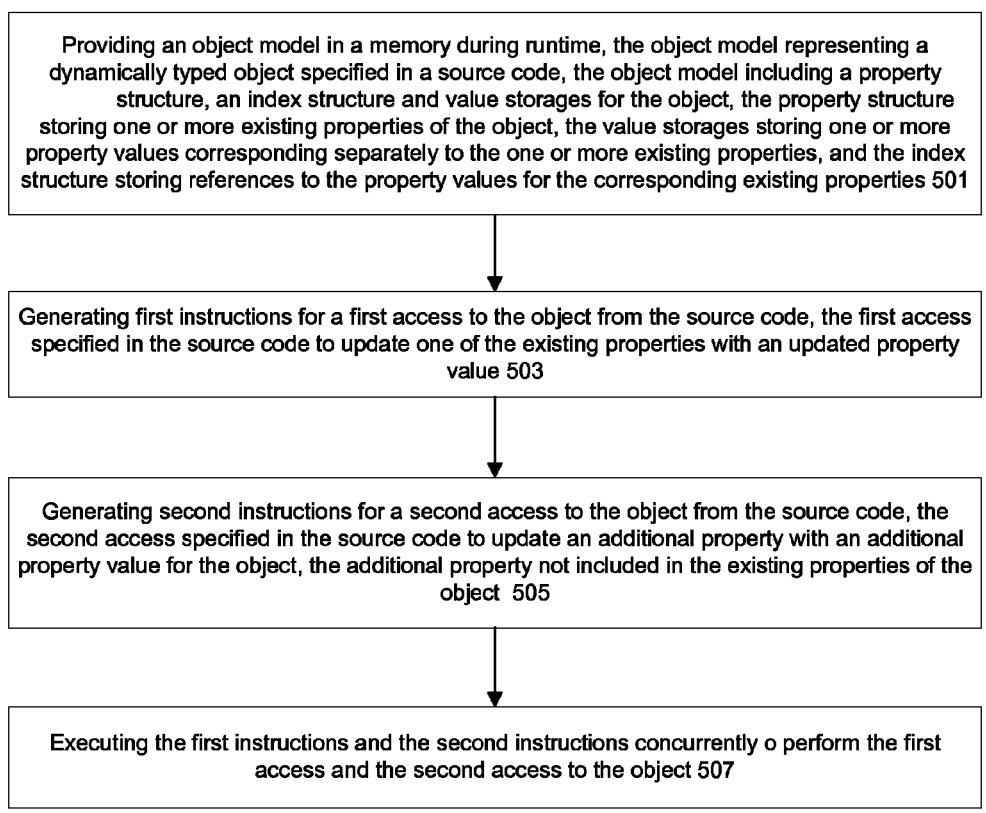
FIG. 5 is a flow diagram illustrating one embodiment of a process to generate concurrently executable instructions for accessing a dynamically typed object.

FIG. 5 is a flow diagram illustrating one embodiment of a process to generate concurrently executable instructions for accessing a dynamically typed object. Exemplary process 500 may be performed by a processing logic, including, for example, some components of system 200 of FIG. 2. At block 501, the processing logic of process 500 may provide an object model in a memory during runtime to represent a dynamically typed object specified in a source code in a dynamic programming language such as JavaScript. The source code may include statements specifying the object without declaring a type or structure for the object.

The object model can include a property structure, an index structure and/or value storages allocated for an object specified or referenced in the source code. The property structure may be a structured data allocated in a memory (or address space of a memory) to store one or more existing properties of the object. The existing properties may indicate a current dynamic type for the object during the runtime.

In one embodiment, the value storages of the object may be allocated dynamically in the memory to store the existing property values of the object. Each property value may separately correspond to one of the existing properties of the object. The index structure of the object may be dynamically allocated to store references of the property values for the corresponding existing properties. A reference may be a direct or indirect pointer (e.g. via executing a code or other applicable mechanisms) to a memory address to locate a value storage storing a property value.

At block 503, the processing logic of process may generate first instructions for a first access to the object from the source code. The source code may include program statements to update one of the existing properties with an updated property value for the first access. In some embodiments, the first access to the updated property value may indicate that the property has been deleted from for the object. The first instructions may include operations such as ExistingWrite( ), Delete( ) etc.

In some embodiments, the first access to the object may be specified in the source to update an existing property of the object with the updated property value. The first instructions may be compiled for the first access with an in-line cache code to include a reference to an expected property structure of the object. The expected property structure may specify an offset location for locating a property storage for the existing property. For example, the offset location may be an index offset to an index structure for a pointer pointing to the property storage. The first instructions may embed the expected property structure of the object and the offset location for the first access to the object.

In some embodiments, the first instructions can embed an expected property structure of the object and an offset location for locating the property value of the existing property of the object. The offset location may be specified in the expected property structure. For example, the offset location may include an index to a pointer array in the index structure. In one embodiment, the first instructions can include operations to determine whether the property structure of the object corresponds to the expected property structure of the object. The first instructions may be executed to perform the first access to update the property storage with the updated property value via the offset location embedded in the first instructions without performing a table lookup operation if the property structure of the object corresponds to the expected property structure.

A compiler, such as compiler 205 of FIG. 2, may generate the first instructions with the expected property structure for the object based on runtime data associated with a runtime execution. For example, the processing logic of process 500 may analyze a runtime profile, such as profile data collected in runtime data 211 of FIG. 2, to predict the expected profile structure for accessing the object. Alternatively or optionally, the processing logic of process 500 may determine the expected property structure of the object based on heuristics or hints provided from an external input, such as user inputs or interfaces to other processing modules.

At block 505, the processing logic of process 500 can generate second instructions for a second access to the object. The second access may be specified by the source code to update an additional property with an additional property value for the object. The existing properties of the object may not include the additional property when the second instructions are executed for the second access to the object.

The second instructions may be executed to allocate a separate property structure, a separate index structure and an additional value storage storing the additional property value for the object, the separate property structure storing the existing properties and the additional property, the separate index structure storing separate references to the value storages and an additional reference to the additional value storage corresponding to the additional property.

In one embodiment, the source code may specify a second property identifier for the second access to the object. The processing logic of process 500 may determine whether the second property identifier identifies one of the existing properties stored in the property structure. For example, the processing logic of process 500 may generate the second instructions as the second property identifier identifies that none of the existing properties the property structure (e.g. AdditiveWrite( )).

At block 507, the processing logic of process 500 may execute the first instructions and the second instructions concurrently to perform the first access and the second access to the object, for example, via separate threads. The first instructions may be executed to update one of the value storages corresponding to one of the existing properties (e.g. ExistingWrite( )). The second instructions may be executed to add an additional property to the existing properties of the object (e.g. AdditiveWrite( )).

According to a certain embodiment, the object model (or concurrent object model) can include a property reference and an index reference. The property reference pointing to the property structure may represent a dynamic type of the object. The index reference pointing to the index structure may represent dynamic data values or property values of the object under the dynamic type. The property structure may store offsets from the index reference of the index structure storing pointers or references to the property values. The offsets can allow indirect reference to the property values via the index structure.

In one embodiment, the property reference of the object may include a pointer pointing the property structure prior to the execution of the first and second instructions. The property reference may point to the separate property structure subsequent to the concurrent execution of the first and second instructions.

In some embodiments, the second instructions may include an atomic update operation on the object to simultaneously update both the property reference and the index reference. For example, the atomic update operation can be performed to compare the property reference with a reference to the property structure and set the property reference to refer to the updated property structure if the property reference corresponds to the reference to the property structure based on the comparison. The compare and setting operations may be performed atomically via hardware support (e.g. built in logic in a processor).

The processing logic of process 500 can generate third instructions for a third access to the object from the source code. The third access may be specified in the source code to retrieve or read a property value of the object. The third instructions can include inline cache operations to determine whether the property reference of the object refers to the property structure. The concurrent object model can allow the second and third instructions to be executed concurrently.

Figure 6:
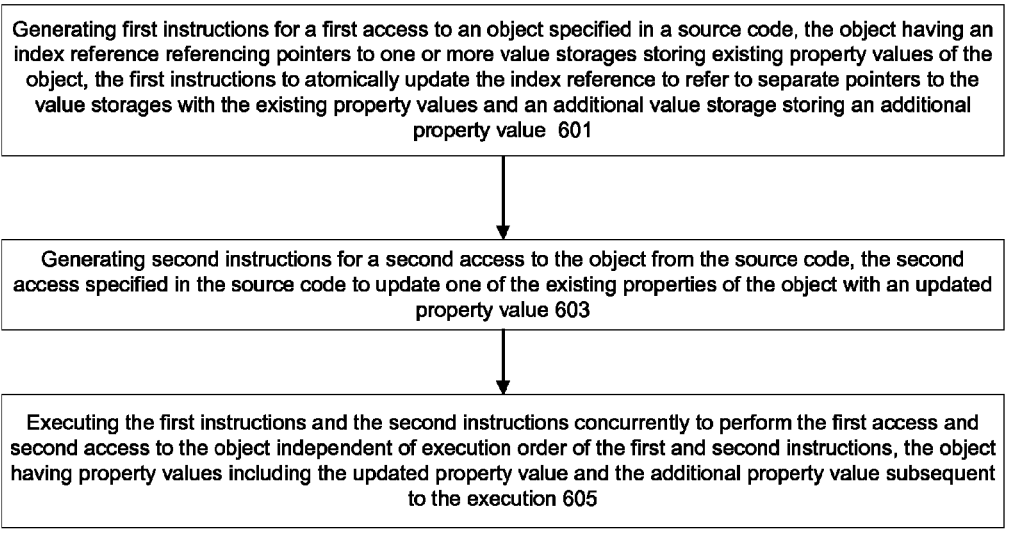
FIG. 6 is a flow diagram illustrating one embodiment of a process to concurrently access property values of an object based on an object model having an index reference.

FIG. 6 is a flow diagram illustrating one embodiment of a process to concurrently access property values of an object based on an object model having an index reference. Exemplary process 600 may be performed by a processing logic including, for example, some components of system 200 of FIG. 2. At block 601, the processing logic of process 600 may generate first instructions for a first access to an object specified in a source code. The object can have an index reference referencing pointers to one or more value storages storing the existing property values of the object. The first instructions may atomically update the index reference to refer to separate pointers which refer to the value storages storing the existing property values and an additional value storage storing the additional property value.

At block 603, the processing logic of process 600 can generate second instructions for a second access to the object from the source code. The second access may be specified in the source code to update one of the existing property values of the object with an updated property value.

At block 605, the processing logic of process 600 can execute the first instructions and the second instructions concurrently to perform the first access and second access to the object. The object can be guaranteed to have property values including the updated property value and the additional property value subsequent to the execution.

Concurrent Inline Cache Optimization

An inline cache code to access dynamically typed objects for optimized inline caching in a concurrent setting may be self modified during runtime. The inline cache code may include a fast code path and a slow code path for accessing a dynamic object. When executed, the inline cache code may determine whether to invoke the fast code path or the slow code path depending on a dynamic type or property of an object encountered.

In one embodiment, a concurrent setting may include operating environments to allow concurrent execution via multi threads and/or multi processes hosted by one or more processors. The modified inline cache code may be reset in the optimized inline caching for the processors to observe changes in instructions in the modified inline cache code.

According to a certain embodiment, the optimized inline caching may modify the inline cache code (e.g. in place editing) via init operations and chain operations. The init operations may be performed to modify (or initialize) an unset (or uninitialized) inline cache code to specialize the inline cache code for a particular object property or structure. The specialized inline cache code may include a fast code path which is invoked when an object with the particular object property is encountered. The chain operations may be performed to modify the inline cache code (e.g. either initialized or uninitialized) to invoke the slow code path via a generated stub (e.g. a piece of code or a function pointer pointing to a generated function code).

Init operations may be performed without requiring processor instruction cache flushing to allow inline caches to get locked in (or initialized) in an efficient manner. In one embodiment, init operations may be performed by particular threads, e.g. thread biasing, to enable the initialization code to stabilize (e.g. initialize) most of its inline cache codes without a need for cross modifying code (e.g. between different threads). Thread biasing may allow inline caches with code modification to run on one thread without a need for synchronization instructions among different threads.

In one embodiment, modifications for code blocks shared by multiple threads in optimized inline caching may be buffered instead of making immediate code changes. These changes may be updated to the code blocks (e.g. via function pointers etc.) when reset operations are performed. Thus, the expense of modifying an inline cache already running concurrently can be reduced.

Reset operations on the inline cache code may be initiated according to a specified time schedule and/or via an infrequently invoked system routine, such as garbage collection routines, to reduce impacts on overall system performance of the execution environments. In one embodiment, a watchpoint routine, e.g. based on instruction cache flush module 219 of FIG. 2, may wake up according to the specified schedule (e.g. every 10 ms or other applicable time interval) to perform the reset operations.

In one embodiment, modifications for code blocks shared by multiple threads in optimized inline caching may be buffered instead of making immediate code changes. These changes may be updated to the code blocks (e.g. via function pointers etc.) when reset operations are performed. Thus, the expense of modifying an inline cache already running concurrently can be reduced.

In one embodiment, inline caching may include optimization mechanisms for dynamic object property lookup. For example, an inline cache code may be emitted at compile time as (e.g. expressed in a pseudo code):

```
if (o->structure == ExpectedStructure)
    v = o->payload[OffsetOfF] /* fast code path */
else
    v = SlowPathRead(o)
```

As the values of ExpectedStructure and OffsetOfF are not known yet, the initially generated code may have a dummy value for ExpectedStructure that may be guaranteed to give a false result for the comparison statement, i.e. o→structure not equal to ExpectedStructure.

Later, when SlowPathRead( ) executes for the first time, ExpectedStructure and OffsetOfF may be modified. Since the values of ExpectedStructure and OffsetOfF are constants in the code, the modification can change the machine code sequence directly. The optimized inline caching in a concurrent setting can provide guarantees of when other processors would observe these changes or editing of this machine code and in what order portions of the code are changed. For example, if OffsetOfF is edited prior to ExpectedStructure, another processor may be required to see the edits in the same order instead of an opposite order to remove the possibility for the fast path to be taken via that processor before observing changes of the value of OffsetOfF.

In one embodiment, inline caching may speed up runtime method binding by remembering the results of a previous method lookup directly at a call site. Assuming that the objects that occur at a particular call site are often of the same type, performance can be increased by storing the result of a method lookup "inline", i.e. directly at the call site via inline caching. In one embodiment, call sites may be uninitialized, for example, when the values of ExpectedStructure and OffsetOfF are not known yet. Once the language runtime reaches a particular uninitialized call site, it may perform the dynamic lookup, store the result at the call site and initialize the call site. If the language runtime reaches the same call site again, it may retrieve the callee from it and invoke it directly without performing any more lookups.

To account for the possibility that objects of different types may occur at the same call site, the language runtime may have to insert guard conditions, such as the statement of o→structure==ExpectedStructure, into the code. Most commonly, these are inserted into the preamble of the callee rather than at the call site to better exploit branch prediction and to save space due to one copy in the preamble versus multiple copies at each call site. If an already initialized call site encounters a type other than the one it expects, it may perform a full dynamic lookup again as if it is not initialized.

In one embodiment, optimized inline caching may allow concurrent self-modifying code modifying more than one word-sized code locations in the instructions without requiring that a processor observes the changed instructions immediately. Processor cache flush mechanisms may be executed to synchronize the processor(s) with the changed instructions.

For example, a processor may not read less than one aligned word, or one instruction, at a time, whichever is smaller. An immediate (e.g. constant operand contained in an instruction) of a 5-byte instruction on an Intel® x86 processor can be a 32-bit word and that word is aligned. If the immediate is changed or modified using a write from another thread, the processor(s) executing that instruction may always either see (or process) the instruction *before* the write or the instruction *after* the write without seeing a torn version of the instruction that includes part of the old instruction and part of the new instruction.

As inline caching requires modifying more than one word-sized code locations, there may be no guarantee that a processor observes the changed instructions immediately due to processor instruction cache. Further, there may be no guarantee on the order and granularity of the memory loading a processor will perform when fetching instructions which have been modified. For example, two different instructions may be modified in a precise order for a code modification, such as a *first* write on one instruction followed by a *second* write on the other instruction. There may be no guarantee that the *second* write of the instructions is not decoded by some other processor before the *first* write of the instructions by that processor.

In one embodiment, when the processor sees (or observes) the changed or modified instructions may depend on when a cache flush mechanism is executed on that processor. Cache flush mechanisms may include, for example, CPUID for Intel® based processors or other similar flushing mechanisms on other hardware, like ARM®. For example, cupid may be executed on a processor to enforce an order of instructions to be fetched by the processor. Similarly, if one instruction is changed and an equivalent of CPUID is then executed on that processor, it can be guaranteed that the processor would observe that new instruction.

In one embodiment, a cpuid may be executed on multiple processors via a thread pinned to (e.g. limited to run on) each processor to wake up the processor, for example, to perform instruction cache flushing. Cpuid may be executed as part of context switching, e.g. storing and restoring the state or context of a process so that execution can be resumed from the same point at a later time. These points (or instructions) of execution (e.g. light safe points or light points) may cause lighter performance impacts compared with the safe-point machinery found in typical multithreaded virtual machines.

In one embodiment, inline cache initialization may be performed based on modifying assembly code, such as:

```
cmpq $0, (%rax)
jne Lslow
movq 0(%rax), %rax
```

For example, constants in the code, such as a pointer-wide constant (e.g. 0 in "cmpq % 0. (% rax)"), and/or a byte-wide or int-wide constant (e.g. 0 in "movq 0(% rax), % rax") may be patched or modified with other values during the initialization. The pointer-wide constant may represent a structure-to-check value and the byte-wide or int-wide constant may represent an offset-to-load-from value. The constant value 0 in "compq $0" may ensure that a slow code path (e.g. "Lslow") is invoked initially. A processor of the assembly code may not observe a non-zero value for the constant for "cmpq" until the constant for "movq" has been patched (or initialized).

Optimized inline caching may allow inline cache codes to get locked in (or initialized) fairly quickly without requiring a light point (e.g. for flushing processor instruction cache) to initialize every inline cache code. Initialized inline cache codes may be executed in optimizing inline caching without incurring additional overhead (e.g. to cause slower execution). In one embodiment, memory buffers may be employed to reduce potential high cost in modification of concurrently running inline cache codes may.

Optimized inline caching may be performed without depending on specific assumptions on how a processor behaves (e.g. how instructions are fetched and executed in the processor). According to some embodiments, optimized inline caching may provide linear speed-up for running multiple (e.g. N) instances of code execution of, for example, Google® JavaScript benchmark version 7 code (or V8 benchmark code), via multiple core (e.g. N core) processors without performance degradation with single instance via a single processor when compared with, for example, non-concurrent inline caching execution.

In one embodiment, inline cache initializations may be offloaded to an interpreter to avoid cross-modifying code. The "code" that an interpreter runs is subject to memory ordering rules similar to those rules applicable to "data" among different processors. Thus, interpreted code may be easier to modify than executable machine instructions. For example, a double-CAS (e.g. double word compare and switch atomic operations) may be applicable to change the structure-to-check and the offset-to-load-from to modify the interpreted code. Then, when the same inline cache code is compiled via JIT (just in time or runtime) compiler, the inline cache code may b pre initialized into the state last seen by the interpreter. As a result, there may be no need to execute expensive initialization procedures (e.g. self modifying code with instruction cache flushing).

Additionally, code block biasing (e.g. executed via a particular thread) may further reduce the overhead of inline cache code initialization, such as frequent changes (e.g. ping-pong changes) between initialized and un-initialized states of an inline cache code. Execution of a code block (e.g. a function code) may start with thread-local assumption (e.g. executed with only one thread). During initialization (of inline cache codes), most codes may be executed on just one thread. Their thread bias may be determined by the thread that compiled the code block.

In one embodiment, each code block may include a thread check guard for a bias-to thread at the top of the code block. During execution, this guard code can be skipped if the caller (to the code block) is already running on the biased-to thread. Inline cache code of code blocks that are biased (e.g. executed via the biased-to thread) may be allowed to be patched without concurrency consideration.

As soon as a code block's thread check guard takes slow path because of a call from a different thread, the code block may be marked (or modified) as requiring concurrent inline caches and the thread check guard may be patched away, such as replacing the thread check instruction with a nop (or no op code). The presence of the thread check guard may force all other threads attempting to call into the code block to take a slow code path for the inline cache code in the code block. The concurrent inline cache code may be invoked for inline caches that change state (e.g. initialized) after interpreter warm-up (e.g. initialization or pre-baking via an interpreter) and only in code blocks that are shared.

Operations which may be performed on an inline cache code may include, for example, init operations to take an unset inline cache and modify it so that it's specialized for some property/structure, chain operations to take an initialized or unset inline cache and modify it so that the slow path branch goes to a generated stub, watchpoint operations to reset an inline cache due to watchpoint execution (e.g. scheduled processor instruction cache flushing) and GC (garbage collection) operations to reset an inline cache during GC because objects were dead.

Init and chain operations may require two discrete operations. For init operations, the two operations may include: 1) patch the offset (e.g. offset-to-load-from value) into the load (e.g. load assembly code) and 2) patch the structure (e.g. structure-to-check value) into the compare (e.g. compare assembly code). For chain operations, these two operations may include: 1) generate a stub (e.g. a piece of code representing a function) and 2) patch the slow path branch (e.g. a pointer in an assembly code) to the stub. Optimized inline caching may prohibit a processor to observer (or see) operations (2) until the processor has already observed operations (1) without requiring performing a light point (e.g. instruction cache flushing) between operations (1) and (2) for each init and chain operations.

For example, operations (2) for chain operations in ARM® based processors may be atomic as a branch to JIT code (e.g. one of those small immediates). Operations (1) for init operations in ARM® based processors may involve multiple instructions and may not be atomic. To enforce the order between operations (1) and (2) for init operations in ARM® based processors (e.g. ARMv7® processors), the offset (e.g. offset-to-load-from value) may be patched to the load (e.g. load assembly cod) and the lower 16 bits of the structure (e.g. structure-to-check value)—leaving the high bits still zero. As there may be no structure (e.g. representing a dynamic type of an object) with value <2^16, the inline cache code may invoke the slow code path even if the patch to the offset is observed by the processor. Subsequently, the high 16 bits of the structure (e.g. structure-to-check value) may be patched into the compare (e.g. compare assembly code) after a light point (e.g. instruction cache flushing) which may require expensive processing resources (e.g. with a performance overhead of about 100 micro seconds).

In one embodiment, optimized inline caching may provide buffering mechanisms to reduce performance costs to enforce operations orderings for concurrent inline caching. For example, assuming a thread (e.g. light point thread) performs the following operations (in pseudo codes):

```
loop {
    sleep 10ms;
    if (buffer.empty( ))
        continue;
    lightpoint;
    while (item = buffer.pop( ))
        item.execute( );
}
```

The light point (e.g. invoked via a dedicated instruction cache flushing thread) can be replaced with a safepoint (e.g. as invoked via a garbage collector). Init and chain operations may be allowed to include:

```
operations (1)
buffer.push(new Item( )
{
    void execute( )
    {
        operations (2)
    }
}
``` where the offset is patched or the stub is generated in operations (1), which may be observed but not executable by a processor because operations (2) have not been performed. As a result, inline cache initializations in shared code blocks by be delayed by at most 10 ms (or other time intervals applicable in scheduling the light point thread). In one embodiment, the light pointing thread may be scheduled (or wakened up, invoked) only when the buffer is non-empty to remove unnecessary light point executions (e.g. when no instructions are modified or when the buffer is empty).

When a GC routine is invoked, safe points of the execution are guaranteed. Thus, the GC routine can modify inline cache codes as much as it likes with the assurance that a CPUID (e.g. instruction cache flushing) is executed before processes/threads are waken up.

When a watchpoint routine is fired or invoked (e.g. to stop the execution of an application whenever the value of a given expression changes, without specifying where it might occur), all threads may be required to observe the jump replacement (e.g. concurrent slow code path) or inline cache reset right away. For example, a thread requesting the watchpoint.fire( ) should not be allowed to proceed further until after all other threads observe the changes to their code. But watchpoints are less common.

In one embodiment, the watch pointing code (e.g. executed via watchpoint.fire( )) may perform a light point operation (e.g. instruction cache flushing) after all of the jumps in inline cache codes are replaced and inline cache codes are reset. Code block thread biasing optimization may be applicable to the watch point code. For example, the light point operation may not be performed if none of the code changes are shared or owned by a thread other than the thread executing the watch point code.

Thus, the optimized inline caches may be performed without slowing down initialization code to lock in inline cache codes fairly quickly and without requiring a light point operation to initialize every inline cache code. Inline cache codes may be initialized with most of the inline cache codes stabilized via a low level interpreter without a need for cross-modifying code. For those inline cache codes that survive in the reset state (e.g. uninitialized) into the JIT, most of them will still run on one thread at that point.

In one embodiment, thread biasing may allow a thread to modify inline cache codes not shared by other threads without concurrency overhead. The slow-down from inline cache code update buffering may only occur in a small number of inline cache codes, for example, shared by more than one thread. The optimized inline caching may not add additional overhead for running initialized inline cache codes.

In one embodiment, buffering mechanisms may lighten up potentially expensive processing resources required to modify inline cache codes running concurrently. The buffering mechanisms for updating inline cache codes may not cause drastic slow down when compared with updating the inline cache updates eagerly (e.g. without buffering). The buffering mechanisms may ensure that the frequency with which light points have to execute is mostly bounded. Although when watchpoints that actually fire may affect shared codes, watchpoints may not be employed except in cases where watchpoints may not fire automatically (e.g. with good reasons to believe that watchpoints will not fire).

The optimized inline caching may be independent of any assumption on how a processor behaves. Light points (e.g. scheduled instruction cache flushing) may be applied to ensure that existing capabilities of processors, such as X86 processors, AMR processors, or other applicable processors are consistent with the requirements of the optimized inline caching, such as instruction cache flushing to synchronize sequences of instructions. Although each of the immediates (e.g. instruction operands such as structure-to-check value or offset-to-load-from value of inline cache codes) patched or modified may be built up by multiple instructions, the optimized inline caching can ensure that the inline cache codes may keep running slowly until exactly one instruction is flipped. The instruction may be flipped only after the processor(s) is forced to observe the rest of the changes made on the inline cache codes.

As a result, the optimized inline caching may provide linear speed-up when running multiple (e.g. N) instances of a benchmark code (e.g. V8 benchmark based JavaScript code) on multi cores (e.g. N cores) processors. Most inline cache codes generated for running the benchmark codes may be initialized very early, for example, before the JITs (e.g. compilers) kick in (i.e. invoked). For those few inline cache codes that survive unset into the JIT (e.g. not yet initialized when JIT is invoked), the use of cache update buffering can make the slow-down (e.g. due to modifying concurrently running in-line cache codes) negligible. In other words, the buffer may get flushed before other warm-up activities (e.g. initializations of inline-cache codes) subside.

Figure 7A:
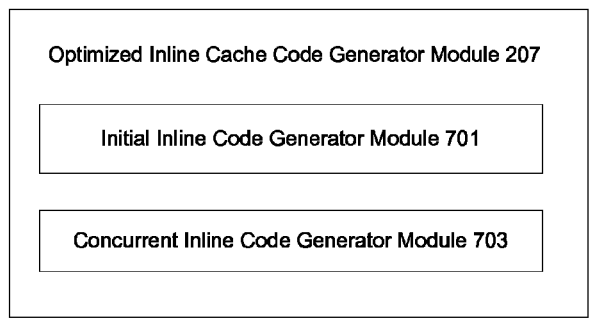
FIGS. 7A-7B are block diagrams illustrating a runtime system to optimize inline cached code blocks for concurrent execution.
Figure 7B:
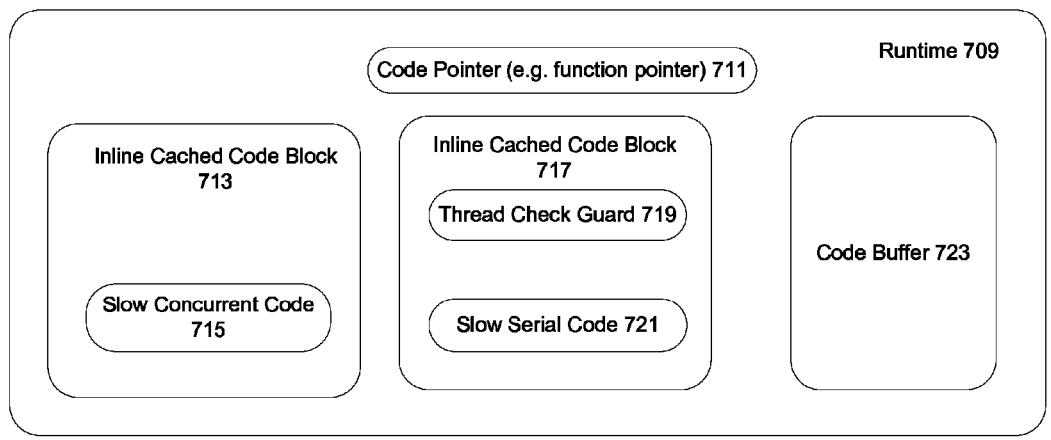

FIGS. 7A-7B are block diagrams illustrating a runtime system to optimize inline cached code blocks for concurrent execution. System 700 may include some components of system 200 of FIG. 2. Turning now to FIG. 7A, optimized inline cache code generator module 207 may include initial inline code generator module 701 and concurrent inline code generator module 703 for generating self modifying code for optimized inline caching.

In one embodiment, initial inline code generator module 701 can provide uninitialized serial inline cache code from a source code compiled via a JIT compiler, such as compiler 205 of FIG. 2. The serial inline cache code may include a serial slow code path (e.g. SlowPathRead( )) and a fast code path (e.g. assembly code based on offset-to-load-from values). The fast code path may include a small number of assembly instructions (e.g. four instructions) accessing or loading values from processor registers (instead of memory addresses).

The serial slow code path may be executed by only one single thread. In some embodiments, initial inline code generator module 701 may emit guard codes (e.g. for checking thread identity) to provide thread bias for executing the serial inline cache code. For example, initial inline code generator module 701 may be invoked via a thread which also executes the serial inline cache code generated by initial inline code generator 701. Thread bias may allow codes which run infrequently to be executed in a single thread without a need for flushing processor instruction cache for in place code modification.

Concurrent inline code generator module 703 may provide concurrent inline cache code which may or may not have been initialized. The concurrent inline cache code may be capable of self modifying when running concurrently by multiple threads. In one embodiment, the concurrent inline cache code may include a concurrent slow code path and a fast code path. The concurrent slow code path may be executed by more than one thread. In one embodiment, the concurrent slow code path may include buffering operations to perform self code modifications (e.g. for inline cache code initialization) via a code buffer to reduce the number of expensive instruction cache flushing to synchronize the code modifications with each processor.

Turning now to FIG. 7B, runtime 709 may include portions of runtime data 211 of FIG. 2. In one embodiment, code pointer 711 may be a pointer, such as a function pointer, for invoking a piece of code or a code block, for example, to implement a function specified in a source code. In one embodiment, code pointer 711 may reference inline cache code block 713 or inline cached code block 717 as separate implementations (or compiled code) of a function.

Inline cached code block 717 may be generated for a function via initial inline code generator module 701 of FIG. 7A. For example, inline cached code block 717 may include slow serial code 721 with a slow serial code path for object data access in the function. Thread check guard 719 may provide thread bias capability for the execution of inline cached code block 717.

Inline cached code block 713 may be generated for a function via concurrent inline code generator module 703 of FIG. 7A. Inline cached code block 713 may include slow concurrent code 715 for a concurrently slow code path and slow serial code 721 with a slow serial code path, each for object data access in the function. Slow concurrent code 715 may be capable of self code modification when running concurrently by more than one thread. For example, slow concurrent code 715 may modify a code block for the function in code buffer 723 which is not yet invoked. Thus, changes to code buffer 723 may be synchronized via a locking mechanism but without a need for processor instruction flushing. In some embodiments, the code block in code buffer 723 may become active when referenced (or pointed to) by code pointer 711.

Figure 8:
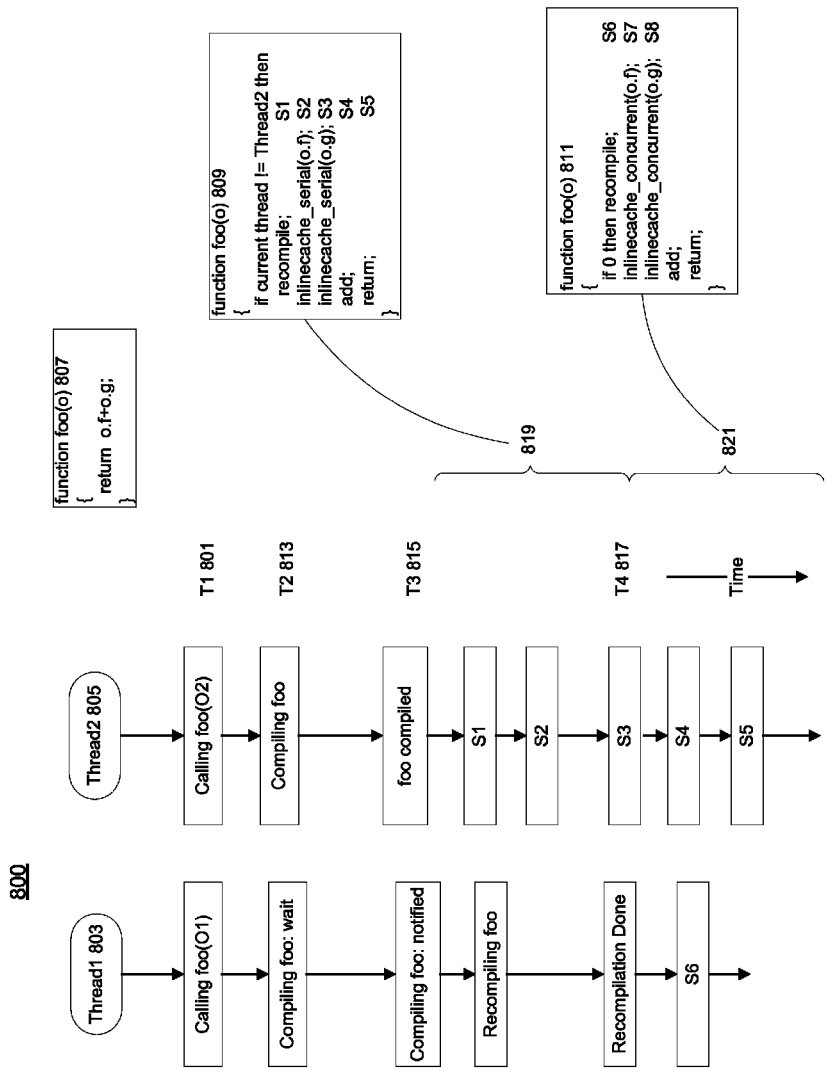
FIG. 8 illustrates exemplary time lines of concurrent executions for dynamically compiling code blocks with inline cache codes.

FIG. 8 illustrates exemplary time lines of concurrent executions for dynamically compiling code blocks with inline cache codes. Example 800 may be based on some components of system 200 of FIG. 2. For example, thread1 803 and thread2 805 may execute instructions including portions of executable code 215 of FIG. 2. Both thread1 803 and thread2 805 may execute codes including a call to function foo 807 specified in a dynamic programming language, such as JavaScript.

In one embodiment, at (or around) time instant T1 801, thread1 803 and thread2 805 call function foo 807 substantially concurrently. Function foo 807 may be compiled, e.g. via JIT compiler 205 of FIG. 2, when invoked the first time (e.g. codes are not compiled until executed). At time instance T2 813, thread2 805 may proceed compiling function foo 807 while thread1 803 blocks waiting for a result of the compilation (e.g. only one thread is allowed to JIT compile the same code at a time).

At time instance T3 815, thread2 805 may complete compiling function foo 807 to generate an initial inline cached code block 809, for example, via initial inline code generator module 701 of FIG. 7. Thread2 805 may notify thread1 803 the completion of the compilation of function foo. Code block 809 may include serial slow code paths S2, S3 for object accesses in function foo. In one embodiment, code block 809 may include a guard code (e.g. including a thread identifier thread_2 identifying thread2 805) for thread biasing. For example, guard code S1 of code block 809 may limit execution of serial slow code paths S2, S3 to thread2 805. Subsequent to the completion of compiling function foo at time instance T3, thread2 805 may proceed executing steps or operations S1, S2, . . . S5 according to code block 809.

Thread1 803 may wake up to call function foo of code block 809 after being notified of the completion of the compilation of function foo 807 via thread2 805. As thread1 803 is associated with a thread identifier different from thread2 805 (e.g. thread_2 of code block 809), execution of guard code S1 of code block 809 may cause thread1 803 to recompile function foo 807.

At time instance T4 817, function foo 807 may be recompiled into code block 811 via thread1 803 while thread2 805 continues executing instructions of code block 809 for function foo 807. Recompilation in one thread may not require other running threads to block. In some embodiments, thread1 803 may be required to grab/release a lock (e.g. with a performance overhead of about 20-40 nano seconds) to perform the recompilation.

Code block 811 may include concurrent inline cache code S7, S8, for example, emitted via concurrent inline code generator module 703 of FIG. 7. In one embodiment, code block 811 may be based on modifications of code block 809. For example guard code S1 of code block 809 may become nop (e.g. null operation) equivalent step S6 in code block 811. During time period 819 between T3 815 and T4 817, code block 809 may correspond to an active code block for implementing function foo 807 for the runtime of thread1 803 and thread2 805. After time instance T4 817, such as time period 821, code block 811 may replace code block 809 as the active code block for function foo 807 in the runtime.

FIG. 9 is a flow diagram illustrating one embodiment of a process to self modify inline codes to access dynamically typed object for concurrent execution. Exemplary process 900 may be performed by a processing logic including some components of system 200 of FIG. 2. At block 901, the processing logic of process 900 can generate initial inline code from a source code block, for example, via initial inline cache code generator module 701 of FIG. 7. The source code block may belong to a source code specified in a dynamic (or dynamically typed) programming language.

For example, the source code block can include program statements specifying at least one access to an object. The source code may not include any program statements declaring a type or structure for the object. In one embodiment, the object can be associated with a dynamic structure having one or more properties with corresponding property values. A type of the object may correspond to the dynamic structure determined during runtime.

In one embodiment, the initial inline code can have serial inline cache code to perform the access (e.g. read, write, update, delete or other applicable data loading/manipulation operations) to the object. The serial inline cache code can include a serial slow code path and a fast code path. A code path may be a sequence of assembly instructions to be executed by a processor. The fast code path may be executed with a small number (e.g. less than 10) of assembly instructions with a performance overhead of about, for example, 5 nano seconds. In one embodiment, the serial slow code path may include a table lookup operation performed by the interpreter (e.g. with a performance overhead of about 100 nano seconds). The serial inline cache code may include comparison operations to determine whether to perform the access to the object via the fast code path or the serial slow code path.

At block 903, the processing logic of process 900 can generate concurrent inline code from the source code block, for example, via concurrent inline code generator module 703 of FIG. 7. The concurrent inline code can have concurrent inline cache code to perform a data access to the dynamically typed object. The concurrent inline cache code may include a concurrent slow code path and the fast code path. The concurrent inline cache code may include comparison operations to determine whether to perform the data access to the object via the fast code path or the concurrent slow code path. The concurrent slow code path may include a table lookup operation to be performed independent of an interpreter.

At block 905, the processing logic of process 900 can execute the initial inline code via a particular thread to perform the data access to the object. In one embodiment, the serial inline cache code may embed (e.g. as immediates of instructions) one or more constant parameters, such as offset-to-load-from constant values and/or structure-to-check values, associated with an object type or a dynamic type of an object. At least one of the constant parameters, such as offset-to-load-from value, may be included in the fast code path.

Whether to execute the fast code path or the serial slow code path may be determined based on the constant parameters. The serial slow code path may be executed via the particular thread to update (or self modify) the constant parameters embedded within the serial inline cache code. The serial slow code path may include callbacks to a compiler (e.g. a JIT compiler) for recompilation.

In one embodiment, the processing logic of process 900 may execute the serial slow code path via an interpreter to update the constant parameters for initializing the fast code path. The interpreter may invoke a data coherency or synchronization mechanism among multiple processors to share the initialized fast code path without invoking an instruction coherence mechanism (e.g. instruction cache flushing) among the multiple processors. A processor may pre fetch instructions into an instruction cache. An instruction cache flushing may require the processor to stop and resume after the instruction cache is cleared.

According to certain embodiments, the values of the constant parameters in the serial inline cache code may be updated via a particular thread before the concurrent inline code is generated. The updated values of the constant parameters in the serial inline cache code may be referenced (e.g. via a JIT compiler) when generating the concurrent inline cache code.

In one embodiment, one of the constant parameters may indicate a pointer to a dynamic structure of an object to represent a type of the object. A separate one of the constant parameters may have a value corresponding to an offset to locate a memory address for accessing an object. For example, the object may be associated with a property value stored in the memory address. The access to the object may include loading (or storing) operations for the property value stored in the memory address. If the object has a dynamic structure (or type) not corresponding the values of the constant parameters (e.g. indicating a pointer pointing to the dynamic structure), the memory address may be determined via a table lookup or a search operation for accessing the object.

The initial inline code may include guard code to prohibit a thread from executing the serial inline cache code. For example, the initial inline code may be generated via a particular thread and the guard code may be executed to determine whether a thread is identified as the particular thread to be allowed to execute the initial inline code including the serial inline cache code.

In one embodiment, the concurrent inline code may be generated as a result of executing the guard code in the initial inline code. The guard code may cause a recompilation operation to generate the concurrent inline code if the thread executing the guard code differs from a particular thread generating the initial inline code. Both the initial inline code and the concurrent inline code may be compiled from a common source code block. Generating of the concurrent inline code may be based on modifications of the initial inline code. For example, the guard code of the initial inline code may be patched to be a no operation code to allow a thread to perform the concurrent inline cache code independent of an identity of the thread.

At block 907, the processing logic of process 900 may execute the concurrent inline code via one or more threads to perform data access operations to the object. The concurrent inline cache code may embed constant parameters for the execution of the fast code path. The concurrent slow code path of the concurrent inline cache code may be executed concurrently to update values of the constant parameters of the concurrent inline cache code.

In one embodiment, a copy of the concurrent inline code may be stored in a code buffer. The copy of the concurrent inline code in the code buffer may be modified to update the constant parameters via, for example, self modifying code. The modification of the copy of the concurrent inline may be performed asynchronously with the execution of the concurrent inline code among multiple threads.

In one embodiment, the concurrent inline code may be executed by one or more processors capable of instruction caching. A dedicated thread may invoke instruction cache flushing (e.g. making instruction cache empty) on the processors, for example, according to a schedule specified independent of when a copy of the concurrent inline code in a code buffer is modified.

Subsequent to the flushing of the instruction caches, the concurrent inline code modified with the updated constant parameters in the code buffer may be invoked to replace the concurrent inline code previously executed as the compiled code for the source code block. In some embodiments, a blank new code buffer may be provided when executing the concurrent line code in the code buffer.

The fast code path may be executed to access an object if the updated constant parameters of the serial inline cache code or the updated constant parameters of the concurrent inline cache code correspond to a object type matching the dynamic type of the object.

FIG. 10 is a flow diagram illustrating one embodiment of a process to dynamically compile a function code block with inline cache concurrently accessing property values of an object based on an object model having an index reference. Exemplary process 1000 may be performed by a processing logic including some components of system 200 of FIG. 2. At block 1001, the processing logic of process 1000 may compile a serial inline cache code for a function via an initial thread. The function may be specified in a source code for accessing an object. The serial inline cache code may include a serial slow code path and a fast code path.

The serial slow code path may be executed to perform the access of the object via table lookup or other applicable search operations which may be slow and require expensive processing resources. The fast code path may be executed to perform the access of the object via direct memory loading operations (e.g. without a need to perform a lookup operation) via a memory address embedded inside the fast code path.

At block 1003, the processing logic or process 1000 may execute the serial slow code path to access the object via an interpreter via the initial thread which compiled the serial slow code path. The memory address of the fast code path may be initialized via the execution of the serial slow code path.

At block 1005, in response to a call to the function via a thread separate from the initial thread, the processing logic of process 1000 may compile a concurrent inline cache code for the function specified in the source code. The concurrent inline cache code can include the fast code path embedded with the memory address initialized via the execution of the serial slow code path.

In one embodiment, the concurrent inline cache code can have a concurrent slow code path for the access of the object via the table lookup operations. The concurrent inline cache code may include instructions to determine whether to perform the access to the object via the concurrent slow code path or the fast code path.

At block 1007, the processing logic of process 1000 can execute the concurrent inline cache code via one or more threads to perform the function without invoking the interpreter. The memory address in the fast code path may be reinitialized if the concurrent slow code path of the concurrent inline cache code is executed.

Flat Array Type for Dynamically Typed Object Models

In one embodiment, a flat array object or an inline stored array data object may be based on an object cell for a dynamically typed object specified in a dynamic programming language. An object cell may be allocated with a fixed size identified at the time of allocation. For example, an object cell may include a type pointer (e.g. 8 byte), a data pointer (e.g. 8 byte) and an optional inline storage (e.g. a number of 64-bit or other fixed sized bit memory space) allocated, for example, adjacent or next to each other in sequence. The inline storage (or inline property storage) may be an inline backing store in the object cell. The type pointer may point to a type structure representing an object type. The data pointer may point to a storage structure (e.g. a backing store) for storing property values for the object type.

In one embodiment, the optional storage may be determined based on a status of memory allocation at the time the object cell is allocated (e.g. when a corresponding object is created during runtime). The optional storage may be determined based on available memory space between adjacent object cells already allocated.

Flat array objects for a dynamic programming language may be provided with a functionality to detect the presence of an object representing array data with a fixed size within a size limit during runtime (e.g. throughout the object's lifetime). For example, the size limit may be pre specified or determined according to an allocation (e.g. storage or memory allocation) to represent a dynamically type object.

An array or data of an array type may include a collection of elements (values or variables), each selected by one or more indices (identifying keys) that can be computed at run time. An array may include a vector and/or a matrix allocated via an array data structures. An array data structure may be allocated to store each element at a position (memory location) which can be computed from its index via a mathematical formula, such as an offset from a memory address storing the first element of the array.

Many Arrays in JavaScript may have a fixed size throughout their lifetime. For example, Array literals (e.g. ['hello', 1, { }]) may have a known size when they are first created at runtime and many of the Arrays created in this fashion do not grow over their lifetime in the program. Additionally, Arrays may be detected to grow within (or never grow beyond) a certain length based on profiling mechanisms (e.g. via profile data collected in Runtime Data 211 of FIG. 2). For an array that never grows beyond a certain fixed size, the backing store to store indexed data of the array may be allocated along side the object cell of the array itself.

In some embodiments, executable code, such as byte code or compiled code, may include array access code which represents an element of an array a[i]=x via an index i, the value of the element x and an extra pointer referencing an array profile object. When the array access code is executed, the array profile may accumulate type information of element value (e.g. x) to establish runtime profile for the array.

A flat array object may be allocated without allocating a corresponding storage structure to store property values (i.e. indexed data). Thus, the number of required memory allocations for a flat array object representing indexed data during runtime may be reduced (e.g. by half) compared with the number of required memory allocations for an object to represent the index data via a storage structure.

In one embodiment, flat array objects representing indexed data may allow runtime optimization to compile (e.g. via JIT compiler) codes accessing or performing operations on the indexed data via the flat array objects. The compiled codes may only operate on the flat array objects.

For example, the runtime, such as concurrent code execution module 217 of FIG. 2, can perform a direct load to access indexed data from the inline backing store of a flat array object representing the indexed data. Compared with indirectly accessing data of an object via loading a storage structure via a data pointer of an object cell for the object and then load the value or data from the storage structure (or backing store), the flat array objects may allow performance optimization for accessing dynamically typed objects based on dynamic languages to achieve near parity with the performance of arrays in lower level or typed languages such as like C.

In one embodiment, indexed data or array data may be stored in a butterfly storage structured to organize property values of an object (e.g. JavaScript object) in a bidirectional manner. A storage structure to store property values of an object may be based on a butterfly storage.

For example, there may be two types of properties that can be added to a dynamically typed object (e.g. JavaScript object): indexed properties and non-indexed properties. Indexed properties may include properties with names that may be integers greater than or equal to 0. Non-indexed properties may include properties with names that are valid identifiers like "foo" and "bar" as defined by the ECMA (Ecma International for Information Communication Technology and Consumer Electronics) specification. Different types of properties may be stored in a butterfly storage in different places to allow a unified way for access.

In one embodiment, indexed properties (or property values of indexed properties) of an object may be stored in a butterfly storage in a 0-indexed sequence of memory cells starting in the middle of the butterfly storage. Non-indexed properties (or property values of non-indexed properties) of the object may be stored in a 0-indexed sequence going backwards from the middle of the butterfly storage. In some embodiments, a data pointer from an object cell representing the object may point at the 0th entry of the indexed portion of the butterfly storage.

A layout of properties (or property values) stored in a butterfly storage in memory may be represented as:

$$[\ldots, p3, p2, p1, p0][ip0, ip1, ip2, \ldots]$$

where pN representing non-indexed property at offset N and ipN representing indexed property at offset N. A data pointer in an object cell representing an object of these properties may point at memory address $\hat{0}$ (e.g. address of ip0) in the butterfly storage. If the object does not have indexed properties, the layout may be represented as

```
[..., p3, p2, p1, p0]
``` with the data pointer pointing at a memory address past the end the allocated butterfly storage (or at the end of where p0 is stored). Similarly, if the object does not require storage for non-indexed properties, the layout of the properties in the butterfly storage may be represented as

```
[ip0, ip1, ip2, ...]
```

In some embodiment, an object may have properties to be stored inline in the inline storage of the corresponding object cell representing the object. The inline storage may include a butterfly storage. The data pointer (or butterfly pointer) in the object cell can point past the end of that inline storage (or memory segment) in the object cell.

According to certain embodiments, an object cell representing a dynamically typed object may include 16-byte (or other applicable size) of storage area. The first 8 bytes of the object cell may include a pointer to a type structure, which may correspond to an abstraction of the type/shape of the object that points to it. Structures or type structures may be built up and modified as a program (e.g. based on JavaScript or dynamic languages) runs and mutates the objects it uses. A type structure can map non-indexed property names to their corresponding offset.

The second 8 bytes of the 16-byte cell may be a pointer or data pointer to a secondary structure or a storage structure, such as a butterfly storage. Next or after the data pointer in the object cell, an optional number of 64-bit values used for inline non-indexed property storage may be allocated. Thus, an object cell for a JavaScript (or other applicable dynamic language) based object may have a memory layout represented as (assuming a 64-bit word size):

```
[structure pointer] [butterfly pointer] [optional inline property storage ...]
0                   8                   16
``` the structure pointer may be a type pointer addressed with offset 0 byte relative to the object cell; the butterfly pointer may be a data pointer addressed with offset 8 bytes; and the optional inline property storage may be addressed with offset 16 bytes. Property values stored within the inline storage may be accessed without a need for an extra indirection via the butterfly pointer.

In one embodiment, an indexing type may be maintained, for example, as bit fields, in the storage structure associated with an object. The indexing type of the object may indicate a type of property values, such as Int32, Double, 'other' or other applicable value types, stored in its backing store or storage structure. A property value without a known type may be assigned the type 'other'.

The indexing type can indicate a shape of the storage structure. For example, property values may be organized in contiguous memory space in a storage structure of shape Contiguous. Optionally or alternatively, indexed property values may be stored as a data array in a storage structure of shape ArrayStorage.

In one embodiment, the indexing type may indicate whether the property values of an object include array data (e.g. Array type for an array object) or non-array data (NonArray type for a non-array object). Additionally, the indexing type can indicate whether an object is a flat array object or not. For example, the indexing type can provide indication whether an object having indexed properties is a flat array object, e.g. Flat Array type, or not according to whether the indexed properties are stored inline or not. In other words, the indexing type indicates whether an array object is a flat array object or not.

An array access or allocation site (or code location) may include a corresponding profiling data structure for recording runtime profiling data, such as profiling data in runtime data 211 of FIG. 2, on arrays or array objects encountered during runtime. In one embodiment, indexing types of the array objects encountered are collected in the runtime profiling data.

In one embodiment, profiling data including indexing types may allow runtime optimizations. For example, the type system of an optimizing compiler may be allowed to reason about the shape (or types, such as Flat Array Type) of array objects encountered. The compiler may insert runtime checks to executable code compiled to make sure code generated based on the assumption of flat array objects operates on an object of Flat Array Type.

Additionally, since the notion of 'flatness' is now part of the compiler's type system, it can hoist (or optimize) these runtime checks out of hot loops (e.g. repeated or iteratively executed instructions), for example, to minimize the time taken or the memory required to execute a program. A compiler's type system may include a collection of rules that assign a type to various constructs—such as variables, expressions, functions or modules of a program. The compiler can also use this type information (e.g. whether an object is a flat array object or not) to generate code that takes advantage of inline stored array data to reduce number of runtime memory allocations, remove indirect memory loadings, etc.

Figure 11:
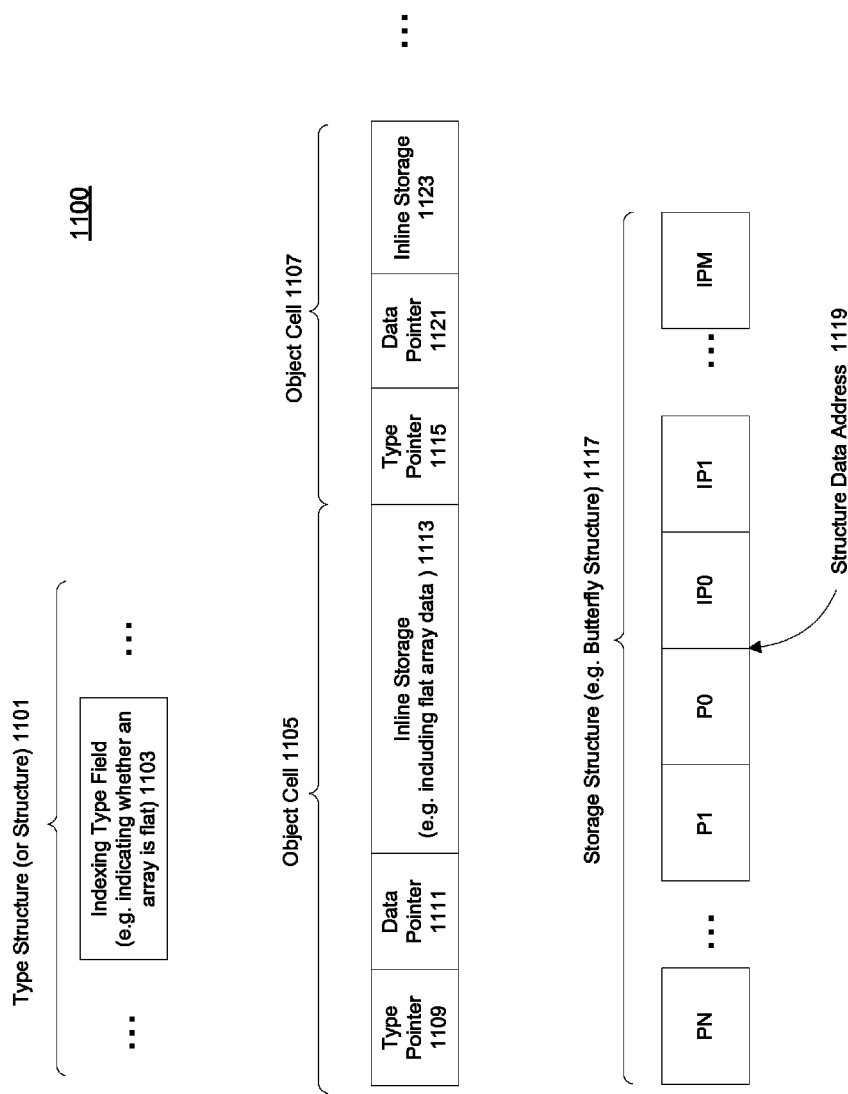
FIG. 11 illustrates examples of object models supporting array data stored inline for flat array objects.

FIG. 11 illustrates examples of object models supporting array data stored inline for flat array objects. Example 1100 may include exemplary object models provided based on, for example, some components of system 200 of FIG. 2. For example, object cells 1105, 1107 may be allocated consecutively in a memory to represent separate objects in a runtime, such as runtime 211 of FIG. 2. Object cell 1105 may include type pointer (or structure pointer) 1109 (e.g. 8 bytes), data (or value) pointer 1111 (e.g. 8 bytes) and optional inline storage 1113. Object cell 1107 may include type pointer 1115 having a common size as type pointer 1109, data pointer 1121 having a common size as data pointer 1111, and inline storage 1123 sized differently from inline storage 1113.

In one embodiment, object cell 1105 may represent a flat array object having indexed array data stored inline within inline storage 1113. Data pointer 1111 may point at inline storage 1113 to allow direct access of the array data within the object cell 1105 itself without indirection of memory loading. Inline storage 1113 may not grow in size limited by, for example, object cell 1107. Type pointer 1109 may point at type structure 1101 storing indexes (or offsets) of array data stored in inline storage 1113. In some embodiments, type structure 1101 may include indexing type fields 1103 indicating a flat array type for the corresponding object.

Object cell 1107 may represent an object having properties with both array data and non-array data. For example, data pointer 1121 may have a pointer value corresponding to structure data address 1119 for storage structure 1117. Non array property values P0, P1 . . . PN and array property values IP0, IP1 . . . IPM associated with object cell 1107 may be allocated in a butterfly bidirectional manner in storage structure 1117.

Figure 12:
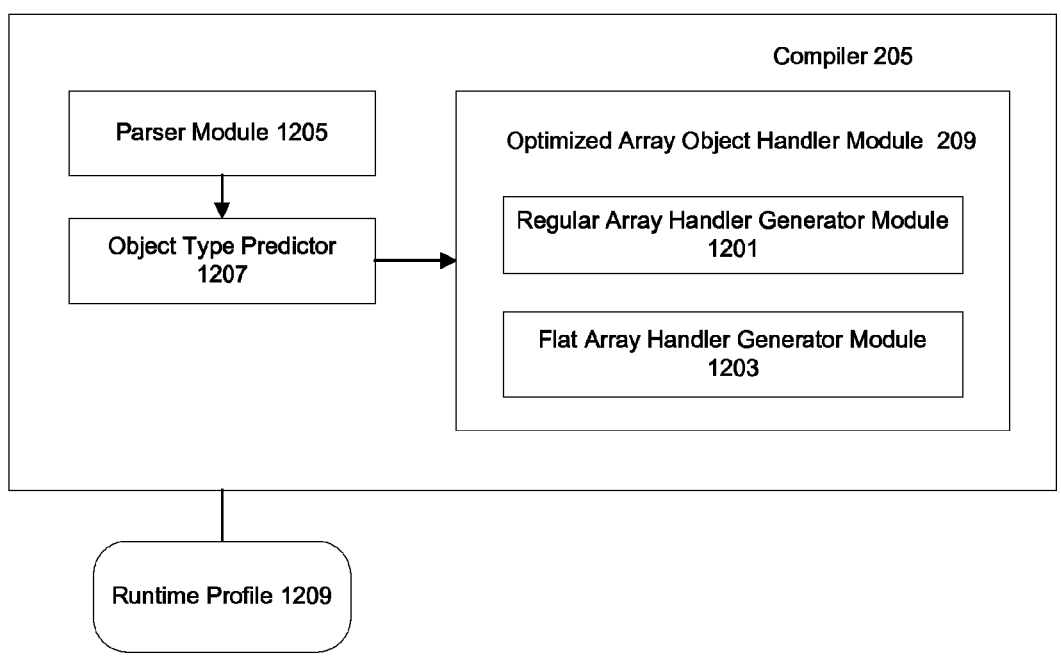
FIG. 12 is a block diagram illustrating one embodiment of a system to dynamically allocate array data inline for optimizing object data access specified in dynamic programming languages.

FIG. 12 is a block diagram illustrating one embodiment of a system to dynamically allocate array data inline for optimizing object data access specified in dynamic programming languages. System 1200 may include some components of system 200 of FIG. 2. For example, compiler 205 may include parser module 1205 to perform syntactic or static analysis on a source code (e.g. JavaScript code), e.g. to properties or syntactic relations between elements of the code. Syntactic analysis may identify potential array objects, e.g. based on types of property values (integer, string, text, structure etc.) or other applicable syntactic structures of the source code. In some embodiments, maximum length of array data for an array object (or array data) may be determined based on result of the syntactic analysis.

Compiler 205 may include object type predictor module 1207 to dynamically infer possible types of runtime objects based on, for example, profiling data in runtime profile 1209 and/or user inputs. Runtime profile 1209 may be continuously collected, for example, in runtime data 211 of FIG. 2, during program execution. User inputs may include hints or heuristics received programmatically or via user interface mechanisms on possible types for certain dynamically typed objects.

In one embodiment, optimized array object handler module 209 may dynamically identify flat array objects based on, for example, type prediction information from object type predictor 1207. Optimized code for accessing an array object which is not a flat array object may be generated via, for example, regular array code generation module 1201. Array data of short or limited length, such as flat array objects, may be accessed directly from inline storages of corresponding object cells based on code generated from flat array code generator module 1203.

FIG. 13 is a flow diagram illustrating one embodiment of a process to dynamically compile code to allocate array data inline. Exemplary process 1300 may be performed by a processing logic including, for example, some components of system 200 of FIG. 2. At block 1301, the processing logic of process 1300 can provide an object model in a memory for executing a dynamic language based program. The object model can represent an object specified with one or more properties in a source code of the dynamic programming language. Each property can have a property name associated with a property value.

The object model may include an object cell allocated in the memory. The object cell can include a value pointer (or data pointer) and an inline storage. The value pointer may include a reference to the property values stored in value storages allocated in the memory. The properties of an object can have an array relationship to represent an array of data.

For example, an object may be associated with an index type (or indexing type) identifiable via a compiler, such as compiler 205 of FIG. 2. The index type may indicate which of a limited (e.g. predetermined) number of object types the object belongs to. Each object type may be semantically associated with a compiler via, for example, a type system in the compiler for code optimization and/or generation.

The processing logic of process 1300 can identify a type of an object during runtime. A type of the object may be stored via an object model including an object cell allocated for the object. For example, a type of an object may be an index type indicating whether the object is an array object or a non-array object and whether the object is a flat array object if the object is an array object.

The processing logic of process 1300 can determine whether an object is an array object according to the presence of an array relationship in the properties of the object. For example, each property name of the properties of an object having an array relationship may be specified to represent an array index in the source code.

In one embodiment, the presence of an array relationship in an object may be identified based on program source and/or execution runtime analysis mechanisms. For example, a static analysis on the source code may indicate that a property name of an object corresponds to an integer value which may represent an array index.

The index type of an object may indicate a flat array object if the object is an array object and the inline storage of the object cell is sized with sufficient space (e.g. memory or storage space) for storing the property values or the array data of the object. In one embodiment, the inline storage in an object cell may be limited by available memory space between adjacent object cells allocated and may not grow arbitrarily. An existing flat array object may become a non flat array object if additional array elements are added (e.g. during runtime) to the properties of the object and the space required to store an entire array of the properties with the additional array elements exceeds the available capacity of an inline storage in the corresponding object cell.

At block 1303, the processing logic of process 1300 may determine if the inline storage is sized with sufficient space for the value storages to store the property value. For example, the amount of storage space for storing an array of data may depend on the length of the array (e.g. maximum number of indices) and the value type for each array element. The processing logic of process 1300 may dynamically detect the length of an array based on the number of property values added to an object representing an indexed array.

At block 1305, the processing logic of process 1300 can determine whether to allocate value storages to store property values, such as an array data, of an object within an inline storage of an object cell corresponding to the object or outside of the object cell. For example, if the inline storage is sized with sufficient space for the value storages, the property values are stored in the inline storage. The property values may be stored outside of the object cell or in an out of line storage if the size of the inline storage is less than the required size to store the property values. An out of line storage for storing an indexed array or an array of data may be allocated when, for example, the index type of an existing flat array object is updated to indicate that the object is no longer of a flat array type.

In one embodiment, the index type of a flat array object may be updated to indicate the object is an array object but not a flat array object if the update property name corresponding to an out of bound index value for an array relationship is associated with the flat array object. The out of bound index value may indicate, for example, that the inline storage of an object cell for the flat array object is sized with insufficient space to store an array of property values having an array length of the out of bound index value.

In one embodiment, an object cell associated with an object may include a type pointer referencing a structure storage allocated to store existing property names of the object. During runtime, an access of the object with an additional name property name may cause the property pointer to be updated to refer to (e.g. point at) a separate structure storage storing copies of the existing property names and the additional property name. The type pointer may represent a dynamic type of the object specified in a source code based on dynamically typed programming language. The index type of the object may be stored in the type pointer, a type structure referenced by the type pointer, or a field associated with the object cell of the object.

At block 1307, the processing logic of process 1300 can generate instructions for an access to property values of an object specified in a source code. In one embodiment, the instructions can include a guard code, a fast code path and a slow code path. The slow code path may be executed to locate value storages storing the property values outside of an object cell representing the object. For example, the slow code path may require indirect memory loading via a value pointer or data pointer of the object cell to perform the access of the property value. The fast code path may be executed to access the property values within the object cell without locating the value storages indirectly via the value pointer.

In one embodiment, the guard code may be executed to dynamically determine whether to invoke a slow code path or a fast code path for accessing property values of an object. For example, the fast code path may be invoked if the property values have an array relationship and an inline storage of an object cell representing the object is sized with sufficient space as value storages to store the property values.

In certain embodiments, whether to invoke a fast code path may be based on an index type of an object. For example, the fast code path may be invoked via a guard code if the index type of the object indicates that the object is a flat array object. Dynamically generated instructions for accessing property values of the object may include a memory loading operation to access the property values via a value pointer stored in an object cell representing the object. If the object is a flat array object, the instructions may be executed to locate the property values (e.g. stored in value storages) without performing the loading operation via the value pointer (e.g. directly from within an object cell).

In one embodiment, a loop (e.g. associated with matrix operations, vector operations, or other iterative operations) for accessing an object may be specified in a source code. The loop may include multiple accesses to the property values of the object. If the index type of the object indicates that the object is a flat array object, the instructions generated for the multiple accesses to the object may be optimized to include one common guard code to determine whether to invoke a fast code path to for each of the multiple accesses to the object directly within the object cell instead of a separate guard code for each access to the object in the loop.

FIG. 14 is a flow diagram illustrating one embodiment of a process to identify a flat array data type during runtime to generate instructions for iteratively accessing objects via flat arrays allocated inline. Exemplary process 1400 may be performed by a processing logic including, for example, some components of system 200 of FIG. 2. At block 1401, providing an object model in a memory during runtime, the object model representing, an object specified with one or more properties in the source code, each property having a property name associated with a property value, the object model including an object cell allocated in a memory, the object cell having a property pointer, a value pointer and an inline storage, the value pointer pointing to a value storage allocated for storing the property values, the property pointer pointing to a property storage allocated for storing the property names At block 1403, identifying a flat array type for the object during runtime, wherein the flat array type indicates that the object represents a array structure, each property name of the object corresponding to an index of the array structure, each property value of the object corresponding to an indexed value of the array structure, wherein the array structure is of a limited length during the runtime, and wherein the array structure is allocated within the inline storage of the object cell for the value storage At block 1405, generating instructions for an iterative access of the object specified in the source code, wherein the iterative access of the object corresponds to a plurality of accesses to separate property values of the object, wherein the instructions include a guard code, a plurality of fast code paths and a slow code path, the slow code path to locate the value storages via the value pointer to locate the value storage outside of the cell object to perform the iterative access of the property value, the fast code path to perform the plurality of accesses to the separate property values within the object cell without checking the index type of the object, the guard code determining whether to invoke the slow code path or the fast code path for the iterative access to the object, wherein the fast code path is invoked if the flat array type of the object is identified FIG. 15 shows one example of a data processing system, such as a computer system, which may be used with one embodiment the present invention. For example, the system 1500 may be implemented as a part of the system shown in FIG. 1. Note that while FIG. 15 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 15, the computer system 1500, which is a form of a data processing system, includes a bus 1503 which is coupled to a microprocessor(s) 1505 and a ROM (Read Only Memory) 1507 and volatile RAM 1509 and a non-volatile memory 1511. The microprocessor 1505 may retrieve the instructions from the memories 1507, 1509, 1511 and execute the instructions to perform operations described above. The bus 1503 interconnects these various components together and also interconnects these components 1505, 1507, 1509, and 1511 to a display controller and display device 1513 and to peripheral devices such as input/output (I/O) devices which may be mice, keyboards, modems, network interfaces, printers and other devices which are well known in the art. Typically, the input/output devices 1515 are coupled to the system through input/output controllers 1517. The volatile RAM (Random Access Memory) 1509 is typically implemented as dynamic RAM (DRAM) which requires power continually in order to refresh or maintain the data in the memory.

The mass storage 1511 is typically a magnetic hard drive or a magnetic optical drive or an optical drive or a DVD RAM or a flash memory or other types of memory systems which maintain data (e.g. large amounts of data) even after power is removed from the system. Typically, the mass storage 1511 will also be a random access memory although this is not required. While FIG. 15 shows that the mass storage 1511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:

providing an object model in a memory during runtime, the object model representing an object specified in a source code, the object model including a property structure, an index structure and value storages for the object, the property structure storing one or more existing properties of the object, the value storages storing one or more property values corresponding separately to the one or more existing properties, and the index structure storing references to the property values for the corresponding existing properties;

generating first instructions for a first access to the object from the source code, the first access specified in the source code to update one of the existing properties with an updated property value;

generating second instructions for a second access to the object from the source code, the second access specified in the source code to allocate a separate property structure, a separate index structure and an additional value storage, the separate property structure to store the existing properties and an additional property not included in the existing properties, the separate index structure to separate references to the value storages and an additional reference to the additional value storage corresponding to the additional property, and to update the additional property by storing an additional property value for the object in the additional value storage; and executing the first instructions and the second instructions concurrently to perform the first access and the second access to the object.

2. The method of claim 1, wherein the first instructions and the second instructions are executed via separate threads.

3. The method of claim 1, wherein the source code is based on a dynamic programming language and wherein the source code specifies the object without specifying a type of the object.

4. The medium of claim 1, wherein the first instructions are executed to update one of the value storages corresponding to the one existing properties with the updated property value.

5. The medium of claim 1, wherein the source code specifies the one existing property for the first access to the object, wherein an expected property structure of the object specifies an offset location for locating a property storage for the one existing property, wherein the first instructions embeds the expected property structure of the object and the offset location for the first access to the object and wherein the first instructions include operations to determine whether the property structure corresponds to the expected property structure of the object.

6. The medium of claim 5, wherein the first instructions perform the first access to update the property storage with the updated property value via the offset location embedded without performing a table lookup operation if the property structure of the object corresponds to the expected property structure.

7. The medium of claim 6, wherein the expected property structure of the first instruction is based on runtime data associated with the execution of the instructions for the access of the object.

8. The medium of claim 6, wherein the expected property structure of the first instruction is based on runtime heuristics provided via user inputs.

9. The medium of claim 1, wherein the source code specifies a second property identifier for the second access to the object, and wherein the generation of the second instructions comprises:
determining that the second property identifier identifies none of the existing properties stored in the property structure.

10. The medium of claim 1, wherein the object model includes a property reference and an index reference, the property reference representing a dynamic type of the object and the index reference representing dynamic data values of the object with the dynamic type, and wherein the property reference refers to the separate property structure subsequent to the concurrent execution of the first and second instructions.

11. The method of claim 10, wherein the second instructions include an atomic update operation on the object, wherein the atomic update operation comprises:
comparing the property reference with a reference to the property structure; and
setting the property reference to refer to the updated property structure if the property reference corresponds to the reference to the property structure based on the comparison, wherein the comparison and the setting are performed atomically.

12. The method of claim 10, further comprising:
generating third instructions for a third access to the object from the source code, the third access specified in the source code to retrieve a property value corresponding to a separate one of the existing properties of the object, wherein the third instructions include operations to determine whether the property reference of the object refers to the property structure and wherein the second and third instructions are concurrently executed.

13. The method of claim 10, wherein the property structure stores offsets from the index reference for the references stored in the index structure, the offsets to indirectly reference the property values via the references in the index structure.

14. A machine-readable non-transitory storage medium having instructions therein, which when executed by a machine, cause the machine to perform a method, the method comprising:
generating first instructions for a first access to an object specified in a source code, the object associated with a property structure, an index structure, and value storages, the property structure storing one or more existing properties of the object, the value storages storing one or more property values corresponding separately to the one or more existing properties, and the index structure storing pointers to the property values for the corresponding existing properties, and having an index reference referencing the index structure, the object further associated with a separate property structure, a separate index structure, and an additional value storage, the separate property structure to store the existing properties and an additional property not included in the existing properties, the separate index structure to separate pointers to the value storages and an additional pointer to the additional value storage corresponding to the additional property, the first instructions to atomically update the index reference to refer to the separate index structure;
generating second instructions for a second access to the object from the source code, the second access specified in the source code to update one of the existing property values of the object with an updated property value; and
executing the first instructions and the second instructions concurrently to perform the first access and second access to the object, wherein the object has property values including the updated property value and the additional property value subsequent to the execution.

15. The method of claim 14, wherein the first instructions are executed to allocate the additional value storage and the separate pointers pointing to the additional value storage and the existing value storages.

16. The method of claim 15, wherein the object has a property reference in the memory, the property reference referencing a property structure representing the one or more existing properties, wherein the first instructions are executed to allocate a separate property structure representing the additional property and the existing properties, and wherein the property reference is atomically updated to refer to the separate property structure when the index reference is atomically updated.

17. The method of claim 16, wherein the first instructions include a compare and set instruction to update the index reference and the property reference atomically and wherein the index reference and the property reference are allocated within a close vicinity in the memory to enable the compare and set instruction.

18. A computer implemented method comprising:
generating first instructions for a first access to an object specified in a source code, the object associated with a property structure, an index structure, and value storages, the property structure storing one or more existing properties of the object, the value storages storing one or more property values corresponding separately to the one or more existing properties, and the index structure storing pointers to the property values for the corresponding existing properties, and having an index reference referencing the index structure, the object further associated with a separate property structure, a separate index structure, and an additional value storage, the separate property structure to store the existing properties and an additional property not included in the existing properties, the separate index structure to separate pointers to the value storages and an additional pointer to the additional value storage corresponding to the additional property, the first instructions to atomically update the index reference to refer to the separate index structure;

generating second instructions for a second access to the object from the source code, the second access specified in the source code to update one of the existing property values of the object with an updated property value; and executing the first instructions and the second instructions concurrently to perform the first access and second access to the object, wherein the object has property values including the updated property value and the additional property value subsequent to the execution.

19. A computer system comprising:

a memory storing instructions and a source code to perform a data processing task, the source code specifying at least an object, a first access to the object and a second access to the object;

a processor coupled to the memory to execute the instructions from the memory, the processor being configured to generate first instructions for the first access to the object specified in the source code, the object associated with a property structure, an index structure, and value storages, the property structure storing one or more existing properties of the object, the value storages storing one or more property values corresponding separately to the one or more existing properties, and the index structure storing pointers to the property values for the corresponding existing properties, and having an index reference referencing the index structure, the object further associated with a separate property structure, a separate index structure, and an additional value storage, the separate property structure to store the existing properties and an additional property not included in the existing properties, the separate index structure to separate pointers to the value storages and an additional pointer to the additional value storage corresponding to the additional property, the first instructions to atomically update the index reference to refer to the separate index structure, generate second instructions for the second access to the object from the source code, the second access specified in the source code to update one of the existing property values of the object with an updated property value, and execute the first instructions and the second instructions concurrently to perform the first access and second access to the object independent of execution order of the first and second instructions, wherein the object has property values including the updated property value and the additional property value subsequent to the execution.

\* \* \* \* \*